(12) United States Patent
Ikawa et al.

(10) Patent No.: US 8,171,215 B2
(45) Date of Patent: May 1, 2012

(54) FILE SERVER, FILE MANAGEMENT SYSTEM AND FILE MANAGEMENT METHOD

(75) Inventors: Hirofumi Ikawa, Fujisawa (JP);
Nobuyuki Saika, Yokosuka (JP);
Shinichi Moriwake, Yokohama (JP);
Hitoshi Kamei, Sagamihara (JP);
Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 12/385,281

(22) Filed: Apr. 3, 2009

(65) Prior Publication Data
US 2010/0205370 A1 Aug. 12, 2010

(30) Foreign Application Priority Data
Feb. 10, 2009 (JP) ................................. 2009-028341

(51) Int. Cl.
*G06F 12/00* (2006.01)
*G06F 17/30* (2006.01)

(52) U.S. Cl. ................. 711/114; 711/202; 711/E12.001; 707/E17.01

(58) Field of Classification Search .................. 711/114, 711/112, 170
See application file for complete search history.

(56) References Cited

U.S. PATENT DOCUMENTS

| | | | |
|---|---|---|---|
| 7,227,713 B2 | 6/2007 | Yamamoto et al. | |
| 2007/0067560 A1* | 3/2007 | Anzai et al. | 711/112 |
| 2008/0270699 A1 | 10/2008 | Anzai et al. | |
| 2009/0083558 A1* | 3/2009 | Sugiki et al. | 713/320 |
| 2010/0005261 A1* | 1/2010 | Shiga et al. | 711/162 |
| 2010/0115223 A1* | 5/2010 | Sakaguchi | 711/170 |

FOREIGN PATENT DOCUMENTS
JP 2007-086843 9/2005

* cited by examiner

*Primary Examiner* — Hoai V Ho
*Assistant Examiner* — Tri Hoang
(74) *Attorney, Agent, or Firm* — Stites & Harbison, PLLC; Juan Carlos A. Marquez, Esq

(57) ABSTRACT

When receiving a file access from the client, the file access program refers to the mapping table, and processes an access to files of on volumes of RAID groups. The file server analyzes the file access states, and groups the files depending on the access time period, defines the file migration pattern based on the grouping, migrates the files, and then carries out a power management operation like a spin-down/-up operation on the RAID groups based on the migration pattern.

15 Claims, 22 Drawing Sheets

FIG. 3
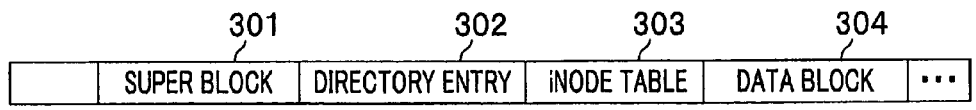
FIG. 4
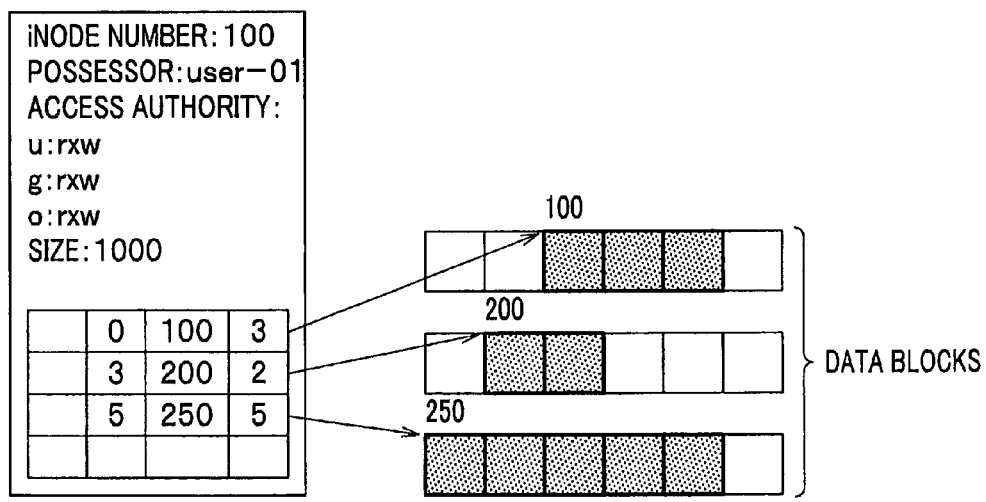
FIG. 5
REFERENCE RELATION BETWEEN iNODE AND DATA BLOCKS
<COMMENTS>
u → user, g → group, o → other (i.e. other than user)
r → read, x → execute, w → write

4000 HIERARCHY MANAGEMENT TABLE

| MOUNT PATH | FSID | HIERARCHY |
|---|---|---|
| /EXPORT | 0x01 | 0x00 |
| /Tier1 | 0x01 | 0x0F |
| /Tier2 | 0x02 | 0x11 |

4001 4002 4003

5000 HIERARCHY DATA LIST

| MOUNT PATH | FSID | POINTER |
|---|---|---|

6000 MAPPING TABLE

| FILE PATH NAME (VIRTUAL FILE SYSTEM) 6001 | iNODE NUMBER FOR VIRTUAL FILE SYSTEM 6002 | RAID GROUP NAME 6003 | FILE SYSTEM NAME 6004 | iNODE NUMBER FOR REAL FILE SYSTEM 6005 |
|---|---|---|---|---|
| /home/user001/a.txt | 100 | Rgroup-A | FS A | 300 |
| /home/user002/b.txt | 101 | Rgroup-B | FS B | 500 |

NO CHANGE ←→ CHANGE

FIG. 12

7000 SCHEDULE TABLE

| RAID GROUP NAME | STOP TIME PERIOD |
|---|---|
| Rgroup-A | 00:00:00 − 06:00:00 |
| Rgroup-A | 17:00:00 − 22:00:00 |
| ⋮ | ⋮ |
| Rgroup-B | 00:00:00 − 03:00:00 |
| Rgroup-B | 09:00:00 − 15:00:00 |
| Rgroup-B | 18:00:00 − 22:00:00 |
| ⋮ | ⋮ |

8000 GROUPING TABLE

| GROUP NAME | FILE NAME |
|---|---|
| GroupA | /home/share/a.txt |
| GroupA | /home/share/b.txt |
| ⋮ | ⋮ |
| GroupB | /home/share/c.doc |
| GroupB | /home/share/x.xls |
| GroupB | /home/share/z.ppt |
| ⋮ | ⋮ |

9000 ACCESS ANALYSIS TABLE

| FILE NAME | USER | ACCESS DATE/TIME |
|---|---|---|
| /home/share/a.txt | foo | 2008/10/01 10:00:00 |
| /home/share/b.txt | bar | 2008/10/01 10:10:00 |
| /home/share/c.doc | anonymous | 2008/10/01 10:10:05 |
| ⋮ | ⋮ | ⋮ |
| /home/share/b.txt | baz | 2008/10/01 10:11:00 |
| ⋮ | ⋮ | ⋮ |

9001, 9002, 9003

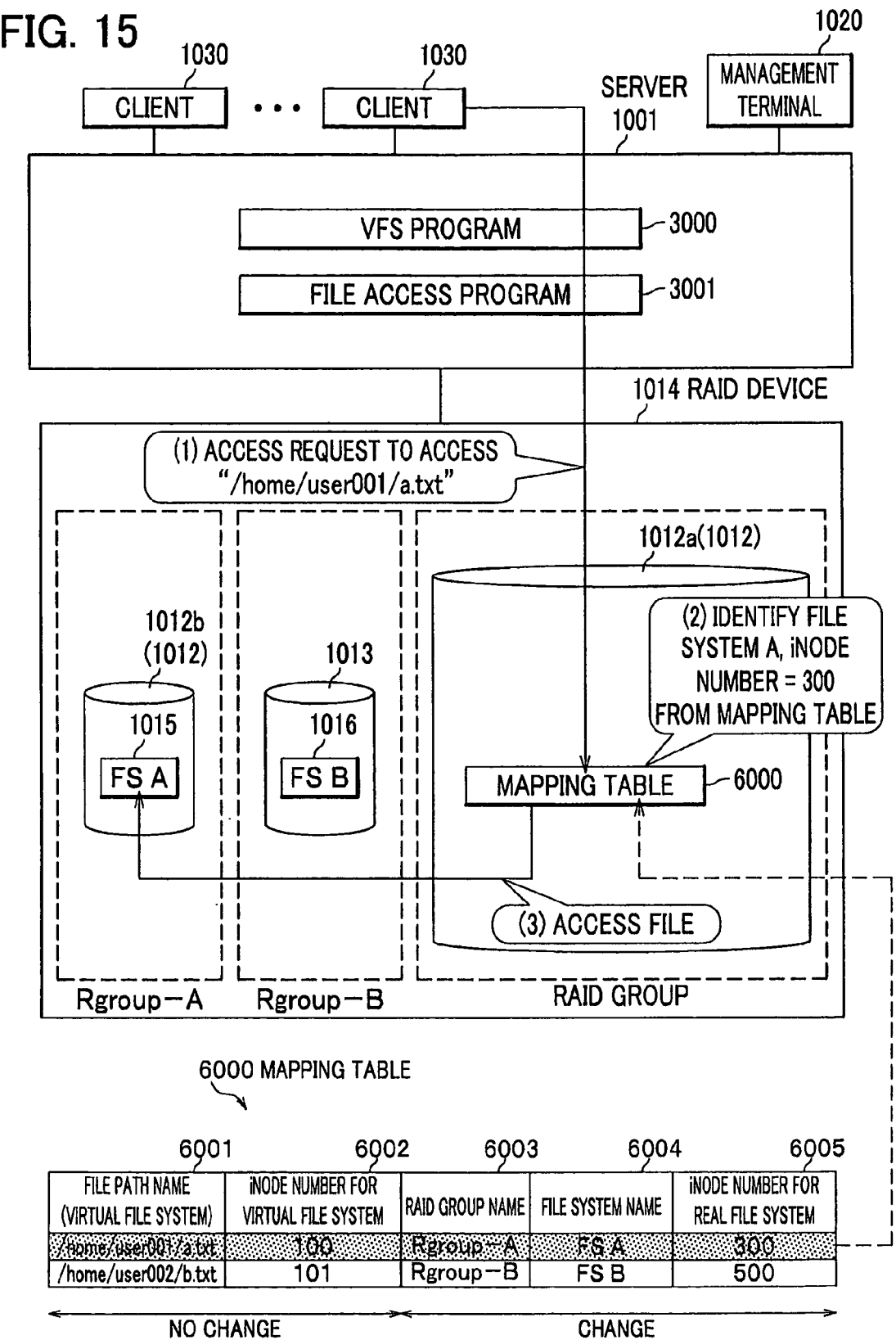

MATCHING CASE

FIG. 27
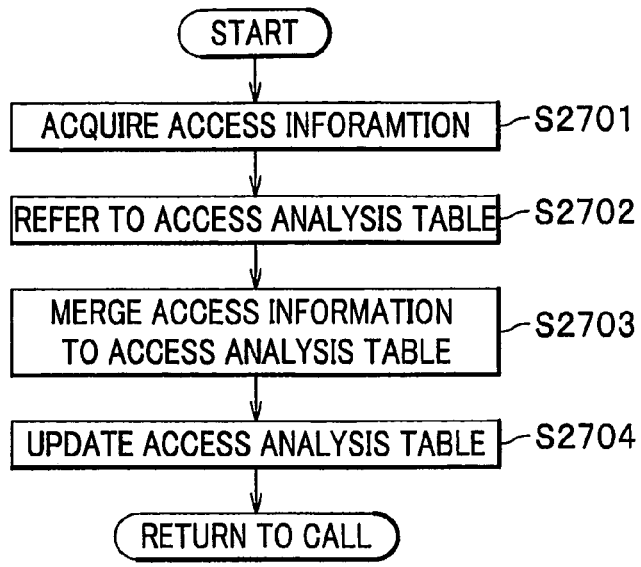
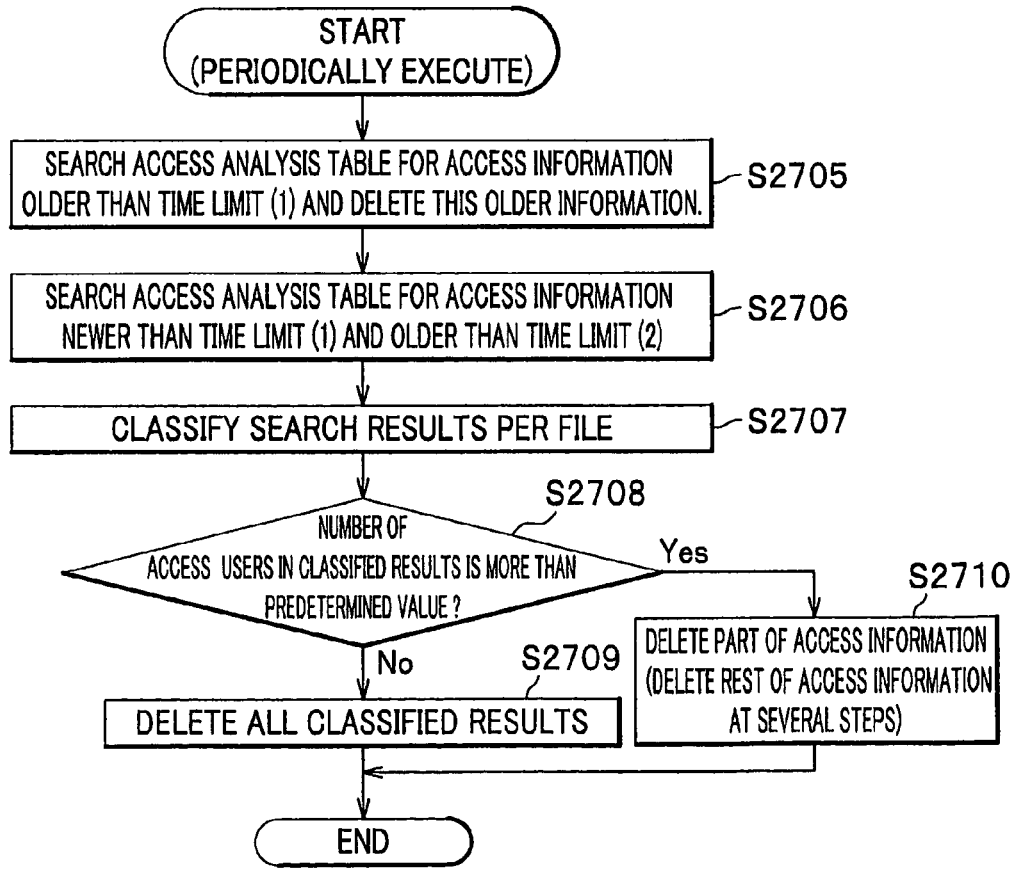

FILE SERVER, FILE MANAGEMENT SYSTEM AND FILE MANAGEMENT METHOD

CROSS-REFERENCE TO RELATED APPLICATION

This application claims the foreign priority benefit under 35 U.S.C. §119 of Japanese Patent Application No. 2009-028341 filed on Feb. 10, 2009, the disclosure of which is incorporated herein by reference.

BACKGROUND OF THE INVENTION

1. Field of the Invention

The present invention relates to management of file systems, in particular, to management of files by virtualizing file systems created in a storage.

2. Description of the Related Art

Recently, there have been increased needs for file service using file management system including a file server or servers (NAS: Network Attached Storage) for managing file systems and more than one storage for storing files of the file systems. In order to meet such needs, there have been increased capacities of a storage for storing files, and more disk devices have been required for building up the storage. As more disk devices are required, more power consumption is required for the entire storages. In particular, increase of power consumption of the entire storages is a big problem for a high-capacity disk array system constituting RAID (Redundant Array of Inexpensive Disks) by using plural disk devices.

JP 2007-86843 A discloses a technique to store metadata on a cache memory before a pin-down operation of HDD (Hard Disk Drive) corresponding to logical volumes on which file systems are created, so as to enable it to refer to file attributes even if the HDD is being spun down, and then start a spin-up operation of the logical volumes, triggered by a reference to this stored metadata, thereby to prevent delay of access response as well as to realize power saving of the entire storage.

However, even such a technique disclosed in JP 2007-86843 A cannot spin down HDD corresponding to logical volumes on which file systems are created if a user accesses even one of plural files managed by a file system. This means that no power saving can be expected under an environment of continuous file accesses.

The present invention has an object to realize power saving even under such an environment of continuous file accesses.

SUMMARY OF THE INVENTION

The present invention provides a file server, a file management system and a file management method, in which the file server communicably couples to a storage device having plural RAID groups, each including at least one volume and communicably coupling to a client that makes a file access request to files; and manages files stored on the RAID groups, using real file systems created for the RAID groups and virtual file systems created by virtually integrating the real file systems. The file server comprises a memory device having memory area for creating information to be stored on the storage device, and a controller; wherein the storage device stores mapping information that associates a file name used for managing the files in the virtual file systems, the RAID groups on which the files are stored, and the real file systems that actually manages the files, with one another for each of the files, and schedule information in which, for each of the RAID groups, a stop time period to spin down and stop the RAID group, and an operation time period to spin up and operate the RAID group are defined; wherein the controller acquires the file name and a file access date/time included in a file access request in response to the file access request made by the client, and creates access information that associates the file name with the file access date/time, and stores the created information on the storage device; wherein the controller classifies files by grouping files having a common file access time period into one group based on the access information, defines some of the RAID groups on which the files grouped into said one group is to be stored in such a manner that the file access time period and the stop time period are not overlapped, migrates the files of said one group to the defined RAID groups during being operated, and updates the mapping information regarding the migrated files; and wherein the controller executes a spin down operation for the RAID groups in the stop time period and executes a spin up operation for the RAID groups in the operation time period.

Other features and advantages of the present invention will become more apparent from the following detailed description of the invention when taken in conjunction with the accompanying exemplary drawings.

BRIEF DESCRIPTION OF THE DRAWINGS

FIG. 3 shows an example of a structure of a file system.

FIG. 4 shows an example of a data structure of a directory entry.

FIG. 5 shows a reference relation between an inode and data blocks.

FIG. 11 shows a data structure of a mapping table.

FIG. 12 shows a data structure of a schedule table.

FIG. 13 shows a data structure of a grouping table.

FIG. 14 shows a data structure of an access analysis table.

FIG. 15 shows a structure of the file management system, describing how an access request receiving process is performed.

FIG. 27 shows a flow of a process carried out by the file access information collection program.

DETAILED DESCRIPTION OF THE PREFERRED EMBODIMENTS

Hereinafter embodiments of the present invention will be described with reference to attached drawings, but the present invention is not limited to them.

Embodiment 1

Figure 1:
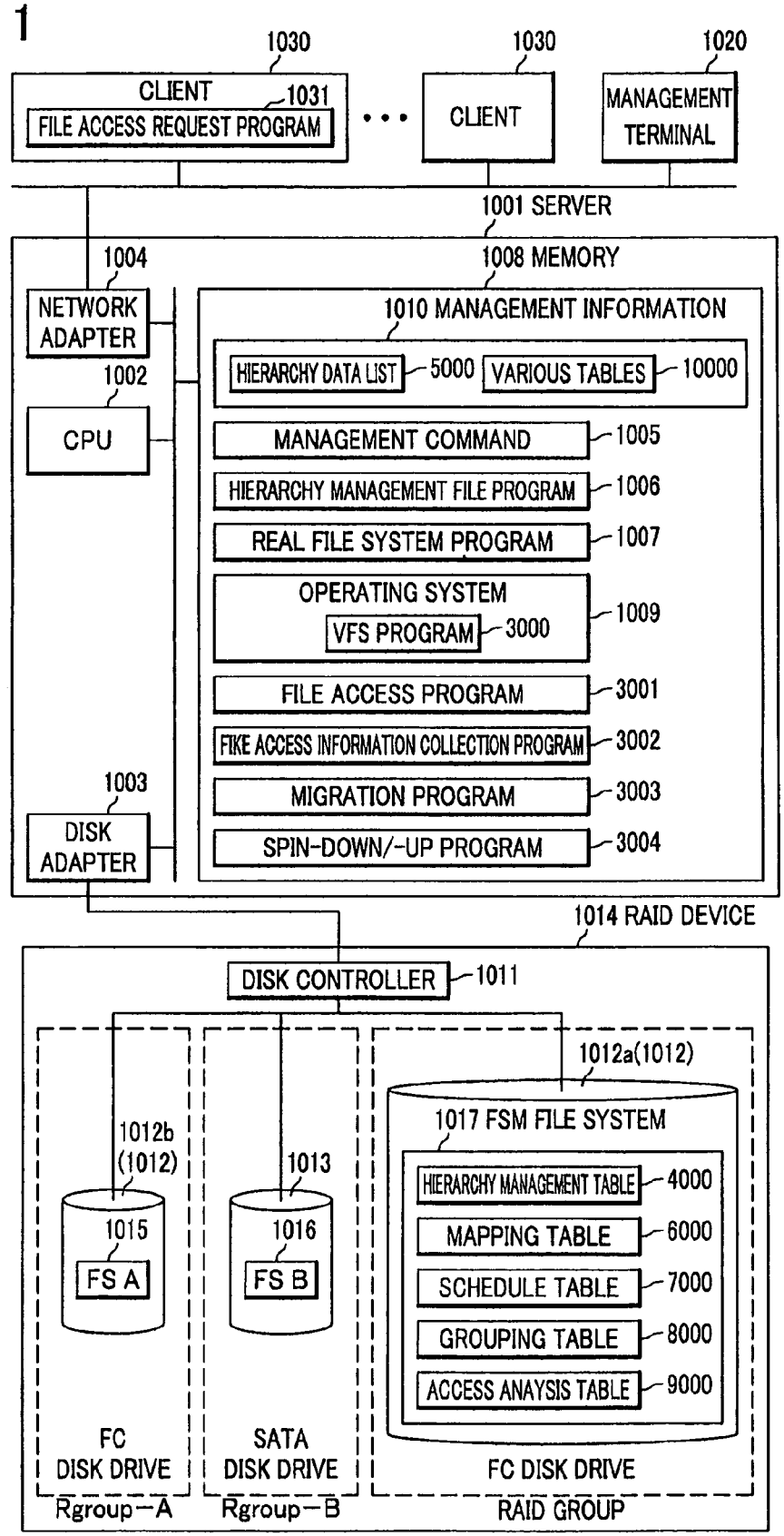
FIG. 1 shows a configuration of a file management system according to the present invention.

FIG. 1 shows a configuration of a file management system according to the present invention. A hierarchical management file system includes a server 1001 (file server), a RAID (Redundant Arrays of Independent Disks) device 1014 coupled with the server 1001, a management terminal 1020 and a client 1030. The server 1001 and the RAID device 1014 are coupled with each other via a SAN (Storage Area Network), for example. The management terminal 1020, the client 1030 and the server 1001 are coupled with one another via LAN (Local Area Network) for example. The management terminal 1020 may be a computer equivalent to the client 1030.

The server 1001 is a computer including a CPU (Central Processing Unit: controller) 1002 that executes programs stored on a memory (memory device) 1008, a disk adapter 1003 used for communication with the RAID device 1014, a network adapter 1004 used for communication with the management terminal 1020 and the client 1030, and the memory 1008 that stores programs and data. These components are coupled with one another via internal communication paths such as buses. Note that when the server 1001 couples with the RAID device 1014 using the disk adapter 1003 via an FC path, and the FC path is appropriately distributed to the RAID groups in operation.

The memory 1008 of the server 1001 stores programs and data. Specifically, the memory 1008 stores the management command 1005, a hierarchical management file system program 1006, a real file system program 1007, an operating system 1009, management information 1010, a file access program 3001, a file access information collection program 3002, a migration program 3003, and a spin-down/-up program 3004.

The management command 1005 manages HSM (Hierarchical Storage Management) function provided by the server 1001. The hierarchal management file system program 1006 embodies hierarchization of file systems, and serves as a main program for the HSM function provided by the server 1001. The real file system program 1007 manages a FS A(1015) and a FS B(1016). FS A is an FC (Fiber Channel) disk drive 1012 of the RAID device 1014, and FS B is a file system of SATA (Serial Advanced Technology Attachment) disk drive 1013. Note that FS is an abbreviated name for a "file system". The operating system 1009 manages the entire server 1001. The operating system 1009 includes a VFS (Virtual File System) program 3000 (described later).

The file access program 3001 is a server program for receiving a connection of a terminal program from the management terminal 1020, and a file access request (also referred to simply as an "access request") from the file access request program 1031. The management information 1010 is management data for providing the HSM function. The above mentioned programs and data will be described in details. Note that a term of "various tables 10000" included in the management information 1010 is a collective term for those tables including the hierarchy management table 4000, the mapping table 6000, the schedule table 7000, the grouping table 8000 and the access analysis table 9000. These above tables are temporarily generated on a certain storage area of the memory 1008 during an execution of processes by the server 1001, and the generated tables are stored on the RAID device 1014.

The hierarchical management file system program 1006 primarily executes a hierarchy management entry process, a hierarchy management drop out process, a management information reconstruction process, a hierarchy transfer process, a Lookup process, a Creat process, a Mkdir process and a Readdir process.

The file access information collection program 3002 is a server program that monitors a file access from the management terminal 1020 or the client 1030, and collects the file access information representing details of a file access for each file.

The migration program 3003 is a program server that migrates files stored on volumes (or RAID groups) located in the RAID device 1014 to other volumes (RAID groups).

The spin-down/-up program 3004 is a program server that performs a spin down process (decreasing rotation speed of a platter of a hard disk down to a predetermined value) and a spin-up process (increasing rotation speed of a platter of a hard disk up to a predetermined value) of RAID groups generated in the RAID device 1014.

Recording media that contain the above-mentioned programs may be produced, and the server 1001 may read these programs from the media to perform the above-mentioned operations.

The spin up process of RAID groups may denote a state shift process that shifts a state of a hard disk included in RAID groups to a state in which a Read request or Write request can be processed. The spin down process of RAID groups may denote a state shift process that shifts a state of a hard disk included in RAID groups to a state to bring power consumption lower than that right after the hard disk is spun up, therefore, this process is not limited to a state shift process to lower the rotation speed of the hard disk down to the predetermined value. Hereinafter, a state in which a rotation speed of a platter of a hard disk is increased up to a predetermined value so that a Read request or a Write request can be processed may denotes a "spin-up state (or a normal state)", and a state that power consumption is lowered than that in the normal state or a state that a rotation speed of a platter of a hard disk is lowered down to a predetermined value may denote a "spin-down state (or a power-saving state)".

The RAID device 1014 includes a disk controller 1011 that controls volumes with which the RAID device 1014 provides the server 1001, FC disk drives 1012a (1012), 1012b (1012) that generates more than one volume to be provided for the server 1001, and a SATA disk drive 1013. The FC disk drive 1012a stores a hierarchy management table 4000 (file system hierarchy management information), a mapping table 6000

(mapping information), schedule table 7000 (schedule information), a grouping table 8000, and an FSM file system 1017 that stores an access analysis table 9000 (access information), which will be described later. The disk controller 1011, the FC disk dive 1012, the SATA disk drive 1013 and the FSM file system 1017 are coupled with one another via internal communication paths. Note that FSM denotes File System Management for short.

There is a difference in performance between the FC disk dive 1012 and the SATA disk drive 1013. For example, the FC disk drive 1012 has a better performance than that of the SATA disk drive 1013. SAS (Serial Attached SCSI) dive may be used as a substitute for the FC disk drive 1012.

The reason for such a choice of disk drives in various types is for the sake of satisfying at least two of conditions of cost, capacity, reliability and performance, etc., since a number of large capacity disk drives in lower cost (such as SATA disk drives) have been spread due to up-to-date progress of technologies, and at the same time, disk drives in higher cost with higher performance (such as FC disk drives, SAS disk drives and SSD (Solid State Disk) using flash memories) have been spread in the market.

The disk drive of the present invention is not limited to the FC disk drive 1012 and SATA disk drive 1013, but may be optical media device such as a CD (Compact Disk), an MO (Magneto-Optical) disk, a DVD (R), which may be any other types of storage device that can generate file systems. The present invention may use not only a disk dive but also any other devices that can be recognized as a file system. In the present invention, a file system using a file sharing protocol such as NFS (Network File System) and CIFS (Common Internet File System) may be used so as to realize a file sharing environment to the client 1030.

In the light of performance of a disk drive, a maximum transfer speed, a maximum IOPS (Input/Output operations Per Second) and the like may come first, but each above performance value may be divided by at least one of cost or power consumption to see a performance of a disk drive. Alternatively, various types of disk drives may be selected taking account of differences in characteristic value other than performance (such as cost, capacity, reliability, etc.). Such a characteristic value may be considered based on a catalogue value provided by a vendor that manufactures disk drives, and may also obtain through actual accessing operations to individual disk drives. Hereinafter, the present specification will deal performance of a disk drive as an explanatory example, but the present invention may be applicable to a disk drive based on various characteristic values other than performance.

The FS A (1015) is generated on the FC disk drive 1012, and the FS B (1016) is generated on the SATA disk drive 1013. The file systems retain data in a file format, which is made by a user from the client 1030. Hereinafter, the file systems may be referred to as "real file systems". As described later, the present invention generates "virtual" file systems as described later, therefore, the "real file systems" mean real file systems generated on volumes.

In the present embodiment, more than one volume created on the FC; disk drive 1012a is handled as one RAID group, and referred to as "Rgroup-A", and more than one volume created on the SATA disk drive 1013 is handled as one RAID group and referred to as "Rgroup-B". More than one volume generated on the FC disk drive 1012b that functions for associating a real file system and a virtual file system is also handled as one RAID group.

Volumes (LU) created on the FC disk drive 1012 and on the SATA disk drive 1013 store files to be requested for access from the client 1030. These LUs are assigned to memory area used by the FS A (1015) and the FS B(1016). Files stored on these volumes are used by a user for the purpose of his or her task.

Volumes created on the FC disk drive 1012a store programs and tables (4000, 6000, etc.) but no files to be used by a user. Therefore, a, user usually does not use these volumes.

The management terminal 1020 is a computer used by an administrative manager who manages the server 1001. An administrative manager uses management command 1005 of the server 1001 from the management terminal 1020 via the network. The client 1030 is a computer that uses file-shared services provided by the server 1001. A user who uses the client 1030 uses file-shared services through the file access request program 1031.

Meanings of terminologies that will be used in the following descriptions are as follows.

(A) File: a logical existence that stores data created by the client 1030 or the server 1001.

(B) Directory: a logical unit for managing files and directories intensively.

(C) Directory name: a name applied to a directory.

(D) Path or path name: identification information for identifying files or directories.

(E) File name: a name applied to a file. Hereinafter, a path name may be included in a file name.

Figure 2:
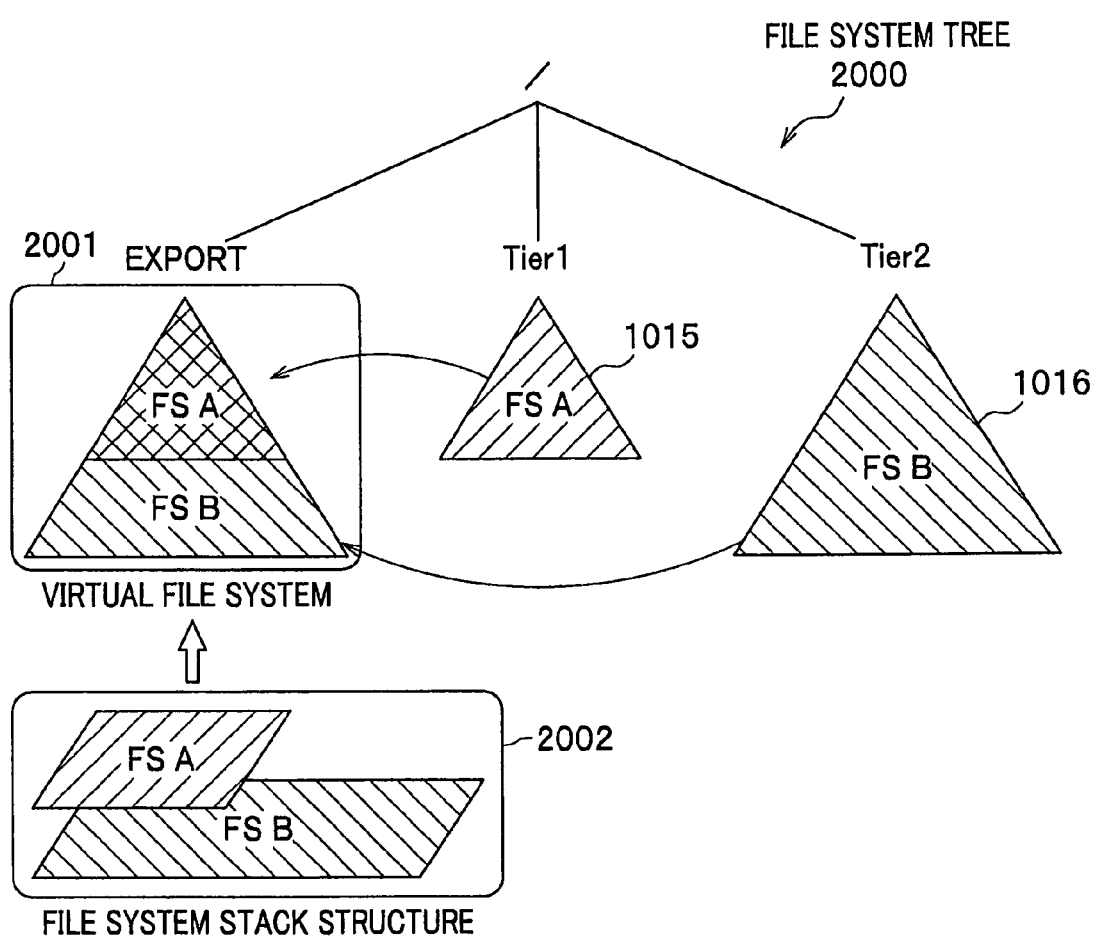
FIG. 2 shows a file system tree structure of an HSM function according to an embodiment of the present invention.

FIG. 2 shows a file system tree structure of the HSM function according to Embodiment 1. The file system tree is built up by the server 1001, and is a file system name space provided for the client 1030.

The file system tree 2000 includes "/(rout)", "EXPORT" and "Tier1" and "Tier2" following the route. The FS A (1015) is mounted on Tier1, and the FS B (1016) is mounted on Tier2. The HSM function of Embodiment 1 stacks Tier1 and Tier2 on the EXPORT directory. At this time, as similar to the file system stack structure 2002, the virtual file system 2001 is created with the FS A (1015) coming above and the FS B (1016) coming below.

In Embodiment 1, the EXPORT and the following part are used by the client 1030. If a user of the client 1030 creates a file, that is, if the user sends a request for creating a file to the server 1001, then a file is created on the FS A (1015). If usage frequency of the file becomes lower, the file is migrated to the FS B (1016). In this way, a file with a lower usage frequency is migrated from higher speed volumes to lower speed volumes. A file with a lower usage frequency may be defined by a user of the server 1001, and may also be defined based on a certain rule predetermined in the server 1001, or may be defined in other ways.

When the HSM function builds up the virtual file system 2001, if then each of the FS A (1015) and the FS B (1016) has a file with an identical name, the file of the FS A (1015) is registered on the virtual file system 2001. As a result, the other file with the identical name of FS B (1016) is not provided for the client 1030. This is because the FS A (1015) is allocated to cover the FS B(1016), as shown in the file system stack structure 2002. Alternatively, the file stack structure may be configured in which the FS B(1016) may be allocated to cover the FS A(1015).

If the FS A (1015) and the FS B(1016) become a target of a file system integration, they may be halted to be provided for the client 1030. As described above, an administrator can integrate file-systems being used as he or she desired.

Hereinafter, detailed descriptions will be provided on file systems. A file system (hereinafter may also be referred to as "FS") denotes a logical structure built up to implementing a management unit called as a "file" on volumes. Such a logical structure may be a table, a queue or the like.

FIG. 3 shows an example of a structure of a file system. The FS includes a super block (file management information) 301, a directory entry (file name-file attribution information correspondence information) 302, an inode table (file attribute information management information) 303, a data block (I/O minimum unit) 304, and etc.

The super blocks 301 denote area for retaining the FS information integrally. Such information integrally retained includes a size and free area of FS, and the like.

The directory entry 302 is an entry for managing an association of a file name with a file attribution. The directory entry 302 makes it possible to, associate one file with one inode (file attribution information).

FIG. 4 shows an example of a data structure of a directory entry. As shown in FIG. 4, the directory entry 302 is a table including the inode number 402 serving as an index of each directory path name 401 and its corresponding inode in pair. An FS uses the inode number of the directory entry to access an inode of interest. The file system program (such as the real file system program 1007) refers to an inode entry of interest so as to acquire its corresponding inode number from a file name (or a directory path) of interest.

An inode denotes an area for retaining various information such as an inode number, a file-possessive authority, a file size, and storage location of data (data block address (or pointer)).

FIG. 5 shows a reference relation between art inode and data blocks. In accordance with information registered on the inode table 303 (described later), data stored on meshed blocks of the data block (i.e. storage location of data) is referred within the access authority.

The inode table 303 is a table for storing inodes.

Figure 6:
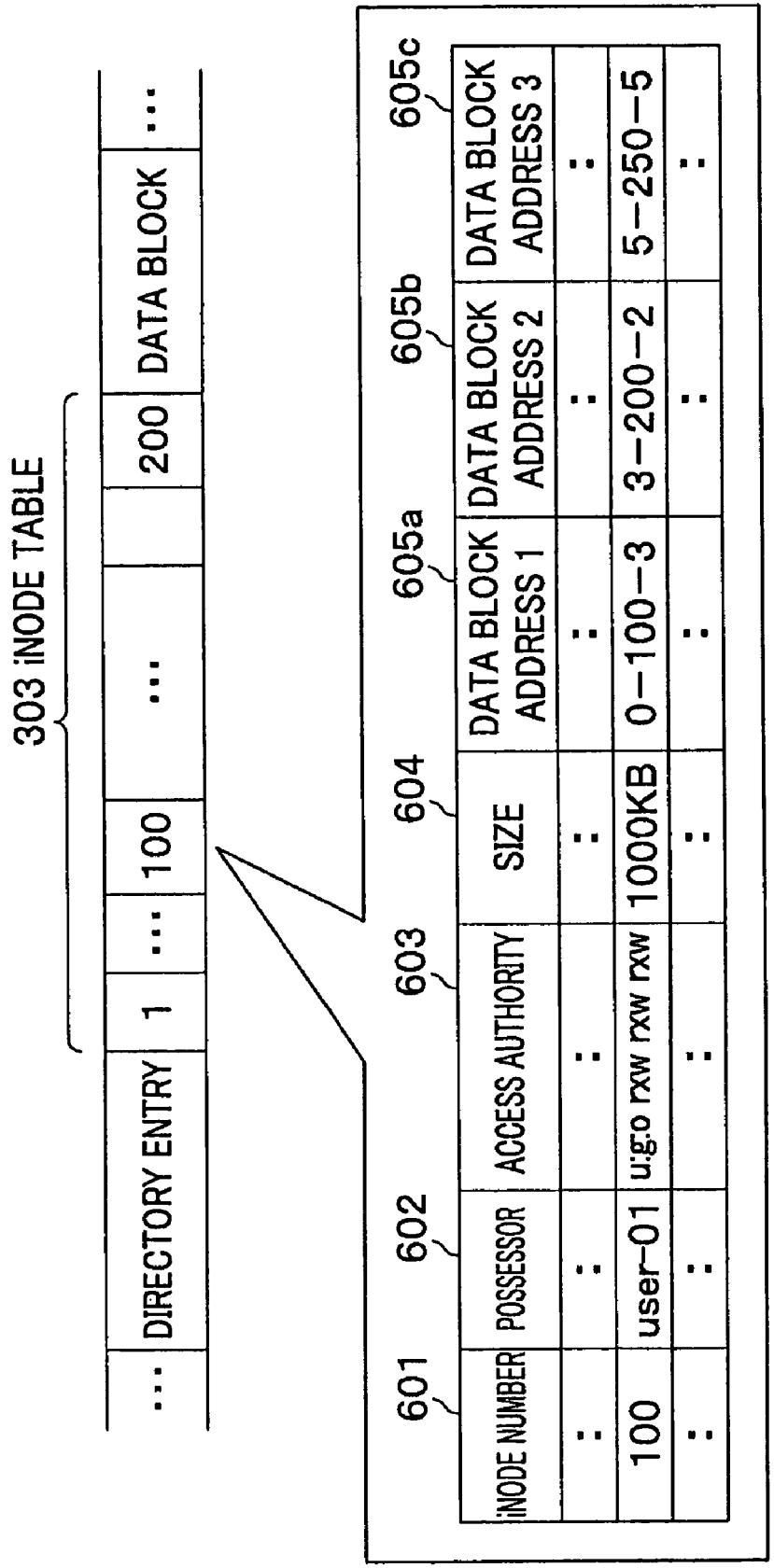
FIG. 6 shows an example of data structure of an inode table.

FIG. 6 shows an example of data structure of the inode table 303. As shown in FIG. 6, the inode table 303 includes an inode number 601, a possessor 602, an access authority 603, a file size 604, a data block dresses 1, 2, 3 . . . (605a, 605b, 605c . . . ) in group.

The data block 304 stores real files and management data, etc.

The descriptions of the file systems are ended here.

Figure 7:
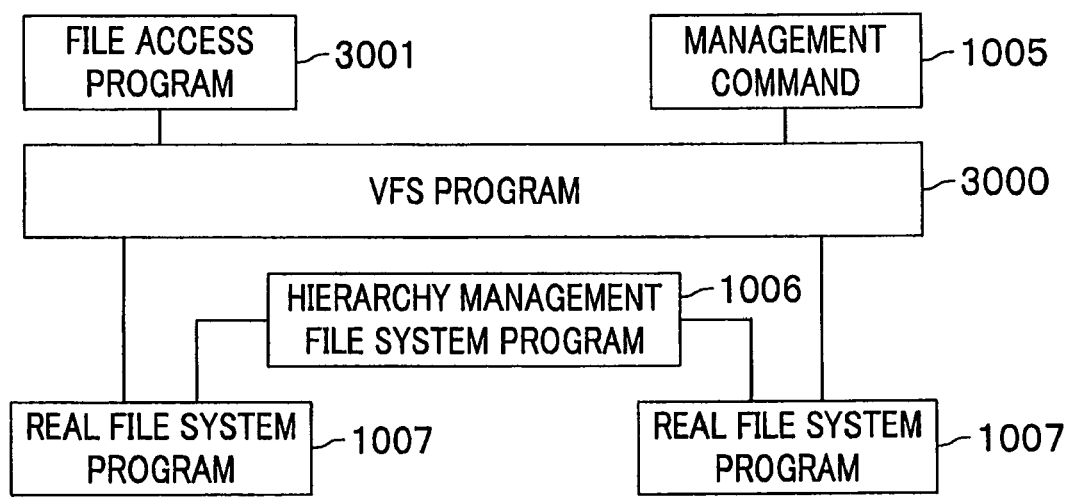
FIG. 7 shows a software structure of the server.

FIG. 7 shows a software structure of the server 1001. The software structure of the server 1001 includes the file access program 3001, the management command 1005, the VFS program 3000, the hierarchy management file system program 1006, and the real file system program 1007.

The management command 1005, and the file access program 3001 such as a file-shared server program that has received a file access request from the client 1030 send an access request to the VFS program 3000, which is part of the operating system 1009. The VFS program 3000 virtualizes access interfaces of the real file system program 1007 and the hierarchy management file system program 1006, and provides these interfaces for the management command 1005 and the file access program 3001.

The hierarchy management file system program 1006 receives an access request from the file access program 3001 and the management command 1005 via the VFS program 3000. The hierarchy management file system program 1006 sends an access request to the real file system program 1007 (such as FS A (1015) and FS B (1016)) as well. On the other hands, the real file system program 1007 may receive an access request directly from the VFS program 3000. As mentioned above, the VFS program 3000 is software that includes an operating system serving as go-between with the file access program 3000 and the file system programs (the hierarchy management file system program 1006 and the real file system program 1007).

The file access program 3001 and the management command 1005 operating on the server 1001 may serve as part of a colonel. A colonel may perform as a general program in an execution environment that is more protected.

A colonel is a software that executes a general control on the NAS, for example, by providing a schedule control of plural programs (processes) executed on the NAS (i.e. server 1001) or handling an interruption from a hardware, and implements basic functions of the OS (operating system).

Various requests received by the file access program 3001 from the client 1030 (file access requests) include the following types, for example. Note that the following descriptions are exemplified as an example in the NFS and the CIFS, but a command other than the following may be included or substituted by other commands.

(A) A "Lookup" request for acquiring an identifier (hereinafter referred to as "file handling identifier") that is required for referring to or handling a file or a directory of the following (B) to (H). An NFS protocol may include, for example, a Lookup command for specifying a path name. When receiving a Lookup request, the hierarchy management file system program 1006 executes a Lookup process.

(B) A "creat" request for generating a file with a specified file name on a specified directory. An NFS protocol may include, for example, a file handle identifier of a directory that is acquired in response to a Lookup request, and a Creat command in which a file name is used as an argument. CIFS protocol may include a SMB_COM_CREATE command in which a directory name and a file name are used as an argument. When a create request is made, the hierarchy management file system program 1006 executes a Creat process.

(C) A "mkdir" request for generating a new directory under a specified directory. FNS protocol may include, for example, a file handle identifier of a directory that is acquired in response to a Lookup request, and a Mkdir command in which a new directory name is used as an argument. CIFS protocol may include, for example, a SMB_COM_CREATE_DIRECTORY command in which a directory name and a new directory command are used as an argument. When a mkdir request is made, the the hierarchy-management file system program 1006 executes a Mkdir process.

(D) A "readdir" request for sending file names or directory names for one or more files or directories existing under a specified directory. IFS protocol may include, for example, a Readdir command in which a file handle identifier of a directory acquired in response to a lookup request is used as an argument. CIFS protocol may include, for example, a SMB_COM_TRANSACTION2: TRANS2_QUERY_PATH_INFORMATION command in which a directory is used as an argument. When a readdir request is made, the hierarchy management file system program 1006 executes a Rearddir process.

(E) A "open" request for requesting the server 1001 for a preparation process to write and read a specified file. NFS protocol may include, for example, an open command in which a file-handle identifier of a file acquired in response to a lookup request. CIFS protocol may include, for example, a SMB_COM_OPEN command in which a file name (path reading) is used as an argument. In this CIFS protocol, an identifier for executing reading or writing of a file as response information of the SMB_COM_OPEN command is sent to the client 1030.

(F) A "read" request for reading data of a file prepared in response to a open request. NFS protocol may include, for example, a read command in which a file-handle identifier of a file acquired in response to a lookup request is used as an argument.

(G) A "write" request for writing data of a file prepared in response to an open request. NFS protocol may include, for example, a write command in which a file-handle identifier of a file acquired in response to a look request. CIFS protocol may include, for example, a SMB_COM_WRITE command in which an open identifier is used as an argument.

(H) A "close" request for ending preparation made in response to an open request. NFS protocol may include, for example, a close command in which a file-handle identifier of a file acquired in response to a lookup request. CIFS protocol may include, for example, a SMB_COM_CLOSE command in which an open identifier as an argument.

When a directory or a file is specified in response to each request, other than a way of using a file name or a directory name in response to said request as an argument, the server 1001 may receive any type of information to identify a directory or a file, as far as the information is receivable for the server 1001.

Among files that the server 1001 stores and manages on volumes thereof, some files are used by the server 1001 itself, and others may be desired to be authorized for a particular client to read or write from the plural clients 1030. To meet such a request, the file access program 3001 of the server 1001 has a function called as an export. This export function provides a particular client 1030 (e.g. a client of an export-destination) with a file and a directory only under a particular directory of file systems (also referred to as a "directory space") defined by the server 1001 oil logical volumes thereof. In this case, for said particular client 1030, the directory space of said file and directory under said particular directory of the file systems is converted to come in a top directory.

For example, if the server 1001 manages a "/home/user1" directory that has a "work" directory having a "homework.txt" file, and a "diary.txt" file, when specifying "/home/user1" as an export directory and specifying a client having a name of "foo" among plural clients, said specified "foo" client sees as if a "work" directory and a "diary.txt" exist right under a route directory of a directory space provided by the server.

Figures 8, 9, 10:
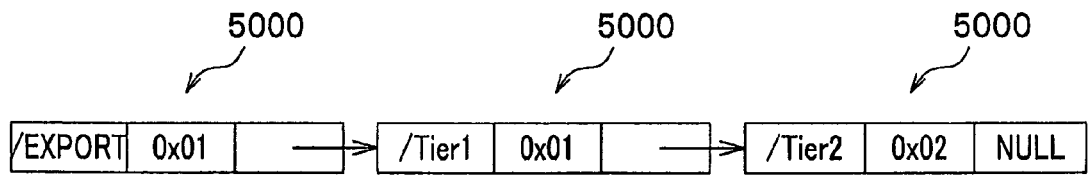
FIG. 8 shows a hierarchy management table which is management information for managing hierarchies of file systems.
FIG. 9 shows a basic data structure of a hierarchy data list.
FIG. 10 shows a data structure of a hierarchy data list that manages a real file system constituting a virtual file system being used in a list form, based on the basic data structure.

FIG. 8 shows the hierarchy management table 4000 which is management information for managing hierarchies of file systems. The hierarchy management table 4000 is part of the management information 1010. When an administrator creates a virtual file system using the management command 1005, the hierarchy management file system program 1006 creates the hierarchy management table 4000 that is information for managing a correspondence of the "virtual" file system to a "real" file system. The hierarchy management table 4000 contains as one record a mount path 4001 showing a mount location of a file system (such as FS A (1015)), an FSID 4002 that is a management ID (identifier) of the file system, and a hierarchy 4003 showing a hierarchy of the file system.

The hierarchy management file system program 1006 registers path information regarding where a file system is mounted on the mount path 4001 with a full path name. This full path name represents a path beginning with "/(route)", such as "/EXPORT" as shown in FIG. 8.

FSID (4002) records values set by an administrator when he or she mounts a real file system. Hereinafter, as for the following FSID, values set by an administrator will be used.

The hierarchy management file-system program 1006 uses a specific value of a hierarchy 4003 for a purpose other than hierarchy. For example, if the hierarchy 4003 is set to be 0x00, the management command 1005 and the hierarchy management file system program 1006 recognize this hierarchy as the virtual file system 2001 (see FIG. 2).

The management command 1005 starts the hierarchy 4003 not with 0x01 (1 in the decadal system), but with 0x0F (16 in the decadal system) and takes an index number of each hierarchy at a second interval. In this way, it facilitates to add a further hierarchy above the uppermost hierarchy, and also facilitates to add a further hierarchy between two hierarchies. This index-number taking method shows an example, and is not limited to this.

FIG. 9 shows a basic data structure of a hierarchy data list. FIG. 10 shows a data structure of a hierarchy data list that manages a real file system constituting a virtual file system being used in a list form, based on the basic data structure. The hierarchy data list 5000 is part of the management information 1010. As shown in FIG. 9, the basic data structure of the hierarchy data list 5000 includes a mount path 5001 representing a path of a real file system being mounted, FSID representing an ID of a file system of interest (500) and a pointer 5003. The hierarchy management table 4000 of FIG. 8 is permanent; meanwhile the hierarchy data list 5000 of FIG. 9 and FIG. 10 is temporary only in operation.

Specifically, the hierarchy data list 5000 of FIG. 10 shows a hierarchical structure having the virtual file system 2001 (/EXPORT) as a head. For example, even when "/Tier1" is removed (drop out from the hierarchy) in response to an instruction from an administrator, the hierarchy management table 4000 is never changed, but the hierarchy data list 5000 is changed. The hierarchy management file system program 1006 rewrites a pointer of "/EXPORT" in the hierarchy data list 5000 to indicate "/Tier2". Then, the hierarchy management file system program 1006 discards data of this "/Tier1". This above way allows the hierarchy management file system program 1006 to efficiently manage both permanent hierarchy structure information and temporary hierarchy structure information.

Hereinafter, the management command 1005 will be described.

<Entry Command for Entry to Hierarchy Management>

Formulas A1 and B1 shows an example of a command to be input when an administrator integrates a real file system into the virtual file system 2001 (i.e. involves a real file system in the hierarchy management). Formula (A1) is a form of a mount command, Formula (B1) shows a specific example thereof.

$$\text{mount-t hmfs-o} T \leq \text{Tier>}, \\ D \leq \text{TARGET><SRC><SRC>} \quad (A1)$$

$$\text{mount-}t\ hmfs\text{-}oT=1, D=/\text{EXPORT/Tier1/Tier1} \quad (B1)$$

An administrator uses a terminal program of the management, terminal 1020 to couple with the file request receiving program (terminal server program) 3001 of the server 1001, so as to log in the server 1001. Then the administrator executes the management command 1005 to involve a virtual file system of interest in the hierarchy management.

In Formula (A1), the administrator, using a "-t" option of the mount command, specifies to use a hierarchy management file system, and then using an "-o" option, specifies an option of the hierarchy management file system program 1006. Among options of the hierarchy management file system program 1006, options used for an entry process to the hierarchy management are "T" and "D". The T option represents a hierarchy of a real file system, and the D option represents a path of the virtual file system 2001. A path of a file system in which the real file system is mounted is specified in "SRC". Specifically, in order to involve the FS A (1015) in the hierarchy management, "/Tier1" is specified, as shown in Formula (B1). In this way, when the entry command of entry to the hierarchy management are input, the hierarchy management file system program 1006 executes a hierarchy-management entry process.

<Management Information Restructure Command>

Formulas (A2) and (B2) show an example of commands to restructure the management information when the mapping table 6000 becomes broken. Formula (A2) is a writing form of a mount command used to restructure the management information, and Formula (B2) shows a specific example thereof $$\text{mount-t hmfs-oI} \leq \text{Tier DB>,D} \leq \text{TARGET>hmfs hmfs} \quad (A2)$$

$$\text{mount-}t\ hmfs\text{-}oI=/HMDB,D=/\text{EXPORT }hmfs\ hmfs \quad (B2)$$

An administrator uses the terminal program of the management terminal 1020 to couple with the file request receiving program (i.e. terminal server program) 3001, and log in the server 1001. Then the administrator executes the management command 1005 so as to involve a real file system in the hierarchy management.

In Formula (A2), a "-t" option represents using the hierarchy management file system program 1006, similar to entry to the hierarchy management. In this restructure process of the management information, an option of the hierarchy management file system program 1006 specified by an "-o" option is different now. That is, the administrator specifies a file system path in which the mapping table 6000 is stored in the I option. The administrator also specifies a path of the virtual file system 2001 in the D option. A specific example with reference to FIG. 2, as shown in Formula (B2), represents that the administrator specifies to restructure a HMDB file stored on the "/".

In this way, when the management information restructure command is input, the hierarchy management file system program 1006 executes the management information restructure process.

<Drop-Out Command from Hierarchy Management>

Formulas (A3) and (B2) show an example of a command input to remove a file system specified by an administrator from the hierarchy management. Formula (A3) is a writing form of a drop-out process to remove the specified file system from the hierarchy management, and Formula (B3), shows a specific example thereof.

$$\text{umount<SRC>} \quad (A3)$$

$$\text{umount/Tier1} \quad (B3)$$

The administrator uses the terminal program of the management terminal 1020 to couple with the file request receiving program (terminal server program) 3001 of the server 1001, so as to log in the server 1001. In order to involve a real file system of interest in the hierarchy management, the administrator executes the management command 1005.

The administrator uses the umount command so as to remove the file system from the hierarchy management. In Formula (A3), the administrator specifies a file system path in which the real file system of interest is mounted. FIG. 2 shows an specific example in which, as shown in Formula (B3), the administrator specifies the hierarchy management file system program 1006 to remove the file system mounted on the /Tier1 from the hierarchy management. In this way, when the drop-out command for drop-out from the hierarchy management is input, the hierarchy management file system program 1006 executes the hierarchy management drop-out process.

<Hierarchy-Transfer Command>

Formulas (A4) and (B4) show an example of a command input by an administrator or a user who uses the client 1030 when he or she transfers a hierarchy of a file. Formula (A4) is a writing form for a hierarchy transfer process, and Formula (B4) shows a specific example thereof.

$$\text{mv\_tier-t2<FILE>} \quad (A4)$$

$$\text{mv-tier-t 2 FILE1} \quad (B4)$$

The administrator uses the terminal program of the management terminal 1020 to couple with the file request receiving program (terminal server program) of the server 1001, so as to log in the server 1001. The administrator executes the management command 1005 so as to involve a real file system of interest in the hierarchy management.

In Formula (A4), "-t" option is for specifying a destination of the hierarchy transfer. Specifically, as shown in Formula (B4), the FILE1 stored on the "/Tier1" is transferred to "/Tier2" by executing this command.

In this way, when the hierarchy transfer command is input, the hierarchy management file system program 1006 executes the hierarchy transfer process.

FIG. 11 shows a data structure of the mapping table 6000. The mapping table 6000 is part of the management information 1010, and shows real file system information of stored files thereof by mapping both the virtual file systems and the real file systems. The mapping table 6000 includes a file path name 6001 that shows a file name of a virtual file system of interest as a file path, an inode number 6002 for a virtual file system that represents an inode number of the virtual file system, a RAID group name 6003 that represents a RAID group in which said files of the virtual file system is stored, a file system name 6004 that represents a real file system that manages said files, and an inode number 6005 for a file system that represents an inode number of said real file system.

The mapping table 6000 associates one file with one record. The VFS program 3000 records a full file path of the virtual file system 2001 on the file path name 6001 of the mapping table 6000. A file name to be recorded on the file path name 6001 is the same name of a file path retained by a file system to be managed in the hierarchy management (i.e. the real file system, such as FS A(1015) and FS B(1016) in the case of FIG. 2). For example, if there exists a file with a name of "/home/user001/a.txt" in the FS A(1015) of FIG. 2, the VFS program 3000 records "/home/user001/a.txt", on the file path name 6001. If there exists a file with a name of "/home/user002/b.txt", the VFS program 3000 records "/home/user002/b.txt" on the file path name 6001.

A user of the client 1030 specifies the file name 6001 to access a file of interest. At this time, the user feels as if he or she accesses the virtual file system, but actually the VFS program 3000 (or the hierarchy management file system program 1006) identifies a record corresponding to the file path name 6001, and then switches the access to the real file system program 1007. Then, the real file system program 1007 realizes the access to files on the corresponding real file system. In the present embodiment, the management information restructure process can restructure the mapping table 6000 if the table becomes broken, thereby to realize a high availability.

If there is a file migration between volumes in different RAID groups, values registered on the RAID group name 6003, the file system name 6004, the inode number for the file system 6005 is naturally changed on the mapping table 6000, respectively, but said values appear not to be changed in the virtual file system, so that the values of registered on the file path 6001 and the inode number for the virtual file system 6002.

FIG. 12 shows a data structure of the schedule table 7000. The schedule table 7000 is part of the management information 1010, and registers schedule information that defines time for a spin-up (start) or a spin-down (stop) operation of the RAID groups to which all the file systems that can be accessed from the server 1001 belong. The schedule table 7000 includes the RAID group name 7001 that represents a RAID group to be started or stopped, the stop time period 7002 that represents a time period when the RAID of interest is stopped. The stop time period may be specified by an administrator from any input means of the management terminal 1020, for example.

FIG. 13 shows data structure of the grouping table 8000. The grouping table 8000 is part of the management information 1010, and registers file information regarding grouped files by summing access information of the files. The grouping table 8000 includes the group name 8001 that represents a group of files having common access properties, and the file name 8002 that represents each file belonging to said group. The file information is defined from the access analysis table 9000.

FIG. 14 shows data structure of the access analysis table 9000. The access analysis table 9000 is part of the management information 1010, and registers access information regarding a file of interest every time a file access request is made for the file of the interest. The access analysis table 9000 includes the file name 9001 that represents a file that has been accessed the user 9002 that represents a user who has accessed to said file, and the access date/time 9003 when the access was made. Note that the access date/time 9003 represents "year", "month", "day" and "time" from left to right, respectively. Other than the above items, the access type (such as a read request and a write request) may also be registered. The file access request includes a file name of a file as an access target, a user who tries to access, and a time when a file access was made (file access date/time). The access date/time 9003 may include a start time of a file access, an end time of a file access, a time period when a file access is made.

The stop time period of a RAID group may be determined by summing access information of files on the access analysis table 9000, statistically estimating a typical time period when the file access is likely to be made, and determining time period other than said typical time period.

Before a file access is made, a user has already been logged in to use a file service provided by the file management system, and after the file access is made, the user has already been logged out. In this sense, a typical time period from log-in to log-out of each user may be determined, and time period other than the determined time period may be determined to be a stop time period of a, RAID group of interest.

Next, descriptions will be given on power saving carried out in Embodiment 1.

As explained above, in the RAID device 1014, at least one file system created from at least one LU (FS A(1015), FS B(1016)) is integrally managed by the server 1001. The VFS program of the server 1001 builds up a virtual file system created by virtually integrating at least one file system. The VFS program 3000 executes the file access program 3001, the file access information collection program 3002, the migration program 3003 and the spin-down/-up program 3004 so as to realize various processes of the access request receiving process, the access monitoring process, the file transfer process, and the spin-up/-down process, respectively. These processes will be described in detail later.

[Access Request Receiving Process]

FIG. 15 shows a structure of the file management system, describing how the access request receiving process is performed. For the convenience of explanation, the drawing of FIG. 1 is simplified. Individual file systems on each RAID group cannot be seen to the client 1030, instead, the client 1030 can see the file systems as virtual file systems.

The client 1030 sends an access request to access a file with a name of "/home/user001/a.txt" (see (1) of FIG. 15). Then, through the VFS program 3000, using a file name of "/home/user001/a.txt" as a query key, FS A (1015) and an inode number for a real file system=3000 are identified from the mapping table 6000 of the RAID device 1014 (see (2) of FIG. 15). Then, a file access is made for the identified file system (FS A (1015)) (see. (3) of FIG. 15), and an access process (such as a read process and a write access) is carried out for each file one by one.

[Access Monitoring Process]

Figure 16:
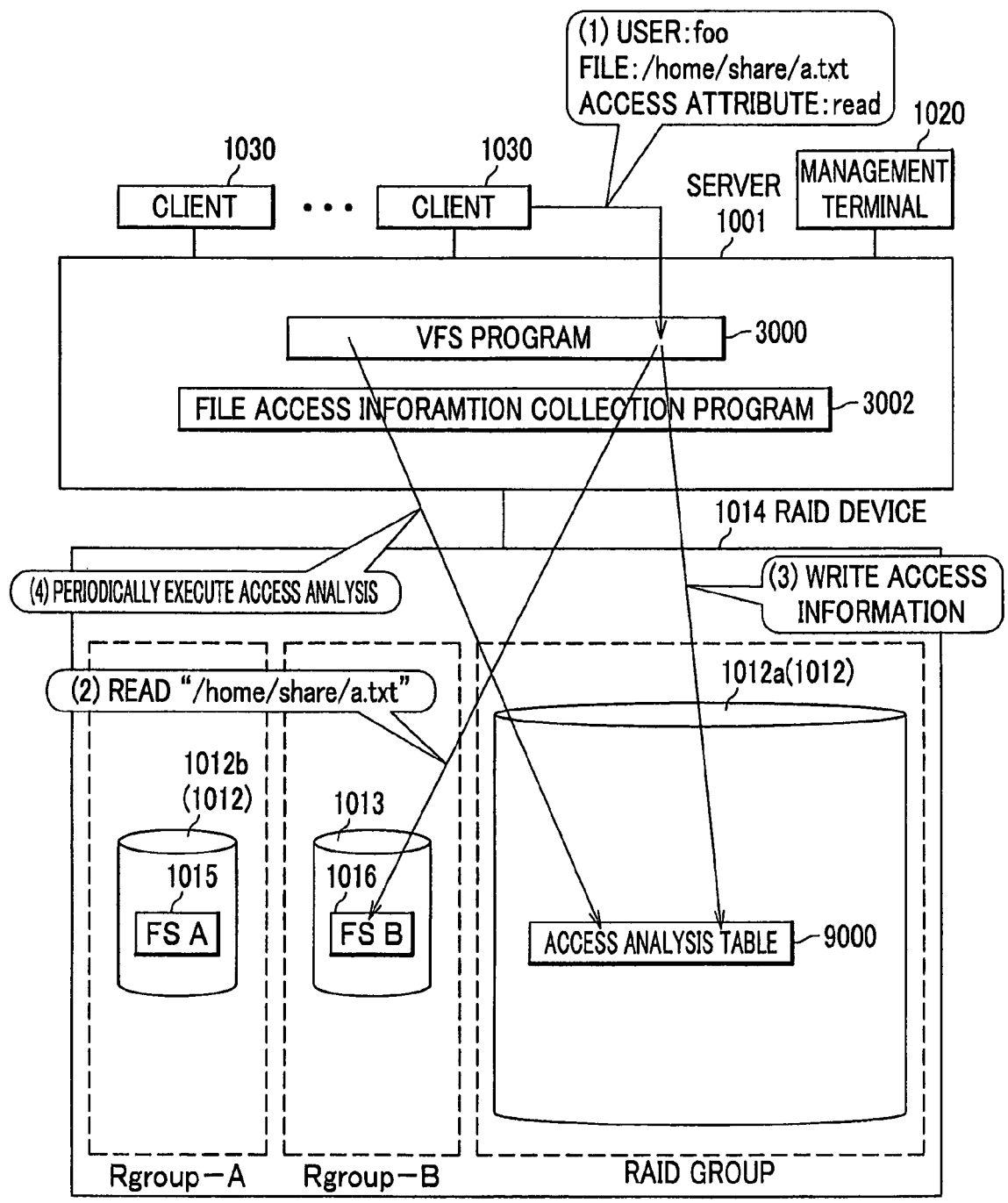
FIG. 16 shows a structure of the file management system, describing how an access monitoring process is executed.

FIG. 16 shows a structure of the file management system, describing how the access monitoring process is executed. For the convenience of explanation, the drawing of FIG. 1 is simplified. The access monitoring process mainly includes two separate processes.

The first process is executed when a file access is made from the client 1030. The server 1001 performs the access monitoring process to monitor an access to the file systems managed by the server 1001 itself.

For example, when a user with a name of "foo" sends a read request to a file of interest with a name of "/home/share/a.txt" (see (1) of FIG. 16) through the VFS program 3000, said file of interest is read from the RAID group where the file of interest is stored (in this case, since said file is managed by the FS B(1016), the RAID group is assumed to be the Rgroup-B) (see (2) of FIG. 16). Then, the access information of the file access is written out (see (3) of FIG. 16), and the access information is stored on the access analysis table 9000.

The second process is periodically executed on the server 1001, regardless of a file access from the client 1030. The VFS program 3000 refers to the access analysis table 9000 and executes an access analysis (see (4) of FIG. 16) periodically. Specifically, as for the access analysis, old access information stored before is deleted in a certain condition.

The above certain condition may include the following, for example:

if a time when a file access is made is older than a predetermined time limit (1) (which is determined based on the access date/time 9003 (see FIG. 14)), the file is deleted unconditionally;

if a time when a file access is made is newer than a predetermined time limit (1) and older than a predetermined time limit (2), and if the number of access users (which is determined based on the user 9002 (see FIG. 14)) is greater than a predetermined value, access information of said file is partially deleted at several steps, and if the number of access users is smaller than the predetermined value, the access information of said file is completely deleted.

The above predetermined time limits (1) and (2), stored on the memory 1008, may be set as configuration information to be read by the file access information collection program 3002. The configuration information may include following two items:

(Configuration Information)
time limit (1): −125 (representing 125 days before the present date)
time limit (2): −75 (representing 75 days before the present date)

The above-mentioned periodical processes provide the following advantages. First, it is possible to create a schedule depending on the present access states. This is because if past old access information remains, no latest states will ever be reflected on the schedule decision. For example, if the time period of a certain file access becomes delayed day by day, the time period for spin-down should be set to become delayed in accordance with this delay of the above time period of the file access. But if the past old access information representing a faster time period of the file access is still reflected, the time period for spin-down will be set to become faster, too, which may cause a problem.

Second, by using the number of access users, it is possible to select desirable access information for creating a schedule. If the access information is deleted only taking the time and date into account, continuation of the schedule before and after the change will be lost, therefore, unconformity will occur between the schedule and the real file access. If many users use certain access information, such access information is worthwhile to use for creating a schedule even if it is a little older access information.

[File Migration Process]

Figure 17:
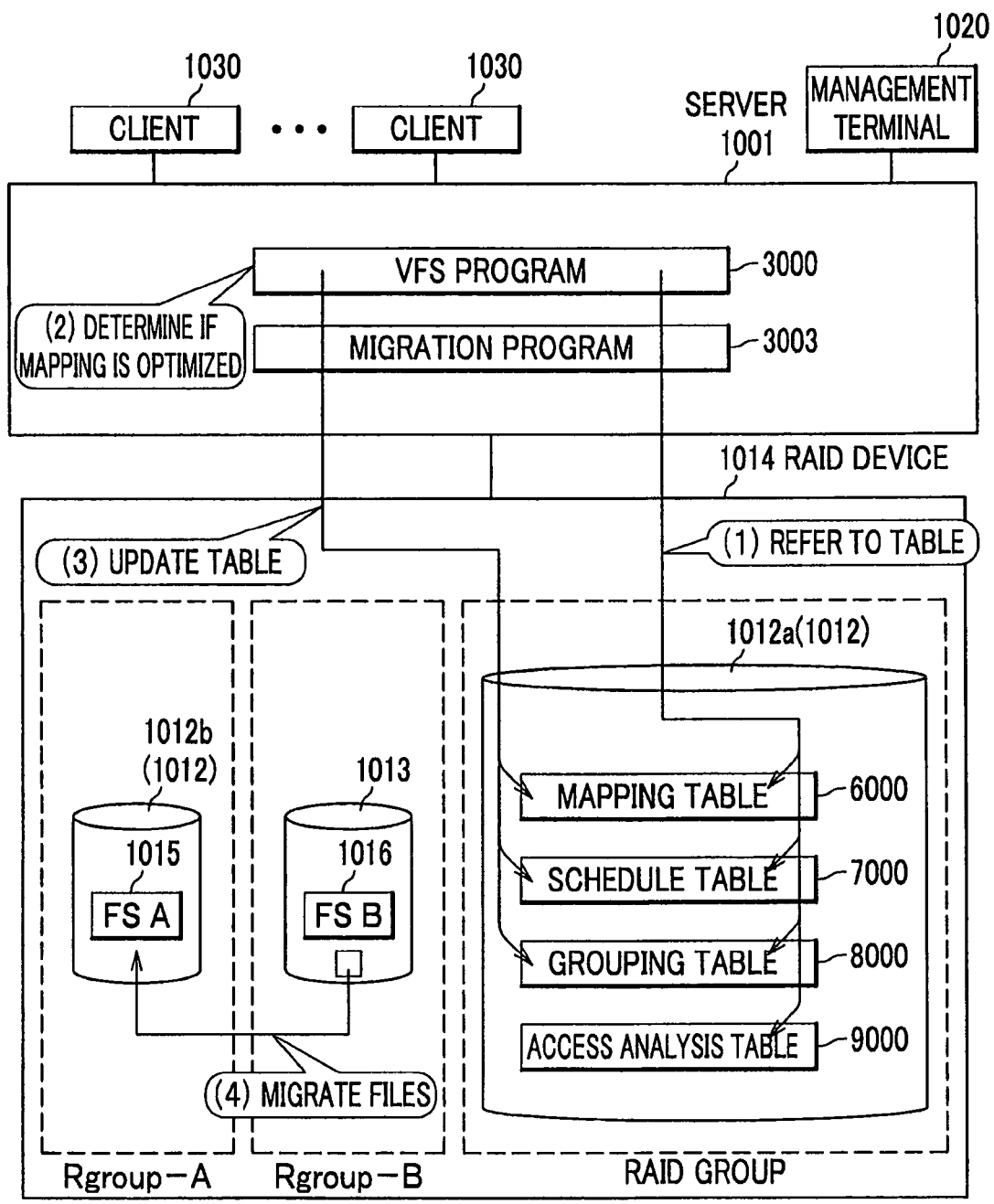
FIG. 17 shows an example of a structure of the file management system, describing how a file migration process is executed.

FIG. 17 shows an example of a structure of the file management system, describing how the file migration process is executed. For the convenience of explanation, FIG. 1 is simplified. In this migration process, file information is created by accumulating the access information acquired through the access monitoring process, extracting a time period when no file access is made from the accumulated result, and grouping files into a group depending on the spin-down schedule and similar access patterns. The schedule table 7000 is generated based on the extracted time period, and the grouping table 8000 is generated based on the above created file information.

Each table (6000, 7000, 8000, 9000) is referred to when a file migration is executed (see (1) of FIG. 17). As a result of the reference, the VFS program 3000 determines whether or not the mapping in virtualization of the file system is optimized (see (2) of FIG. 17. Details thereof will be described later). If the mapping is not optimized, the VFS program 3000 updates the mapping table 6000, the schedule table 7000, and the grouping table 8000, respectively (see (3) of FIG. 17, and then migrates the files during the time period when the RAID group is not stopped (see (4) of FIG. 17).

In migration of the files, the RAID group name 6003, the file system name 6004, the inode number for the real file system 6005 are, changed and updated on the mapping table 6000, the change of storage locations of the files due to the file migration cannot seen by a user.

Detailed descriptions will be given on how to group files. FIGS. 18, 19, 20 and 21 show how to group the files and change the groups.

Figure 18:
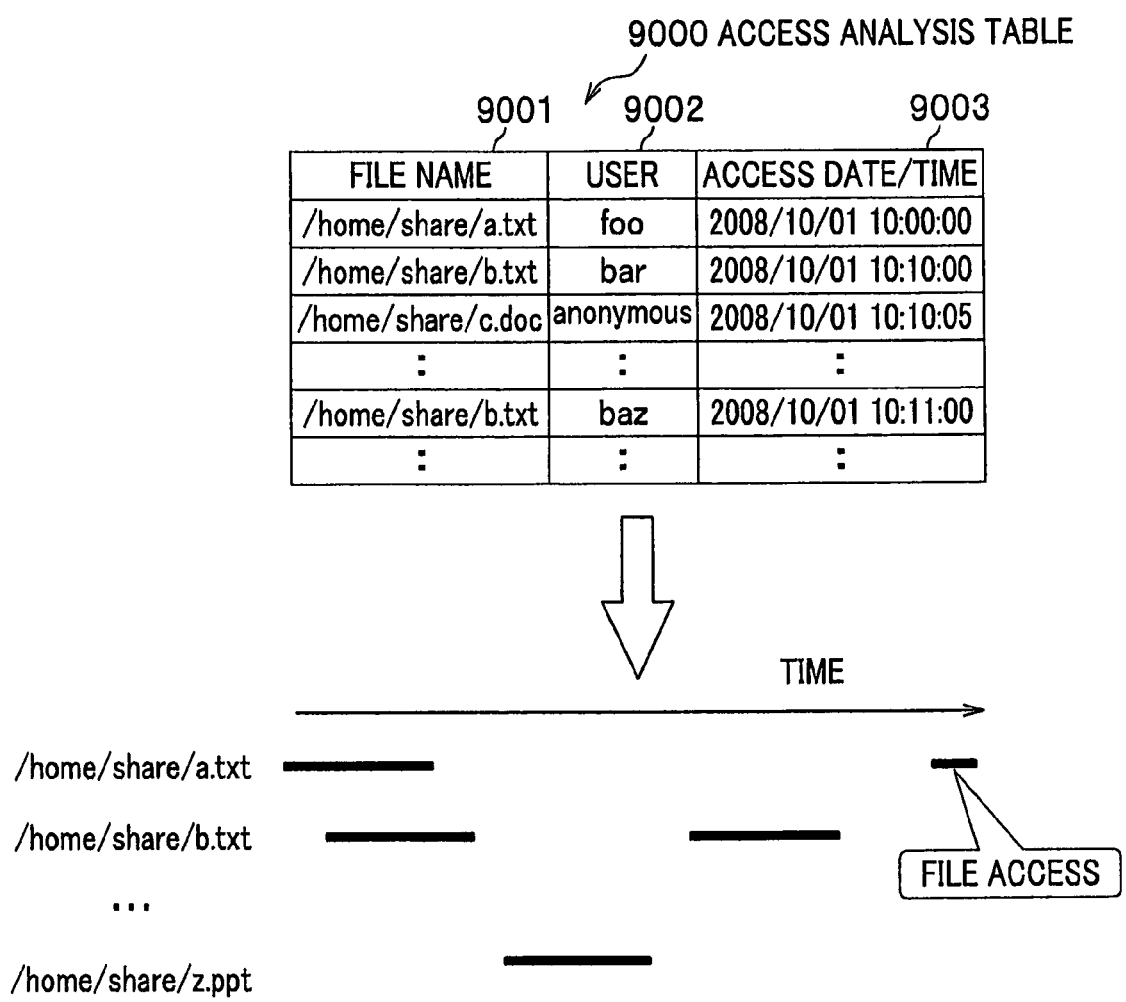
FIG. 18 shows how to group files and change their groups.

When grouping the files, first, the access time of files of interest (as well as the directory and the file system, etc.) is calculated from the access analysis table 9000. In FIG. 18, each file carries a black bold line or lines, which represents a time when a file access is made.

Figure 19:
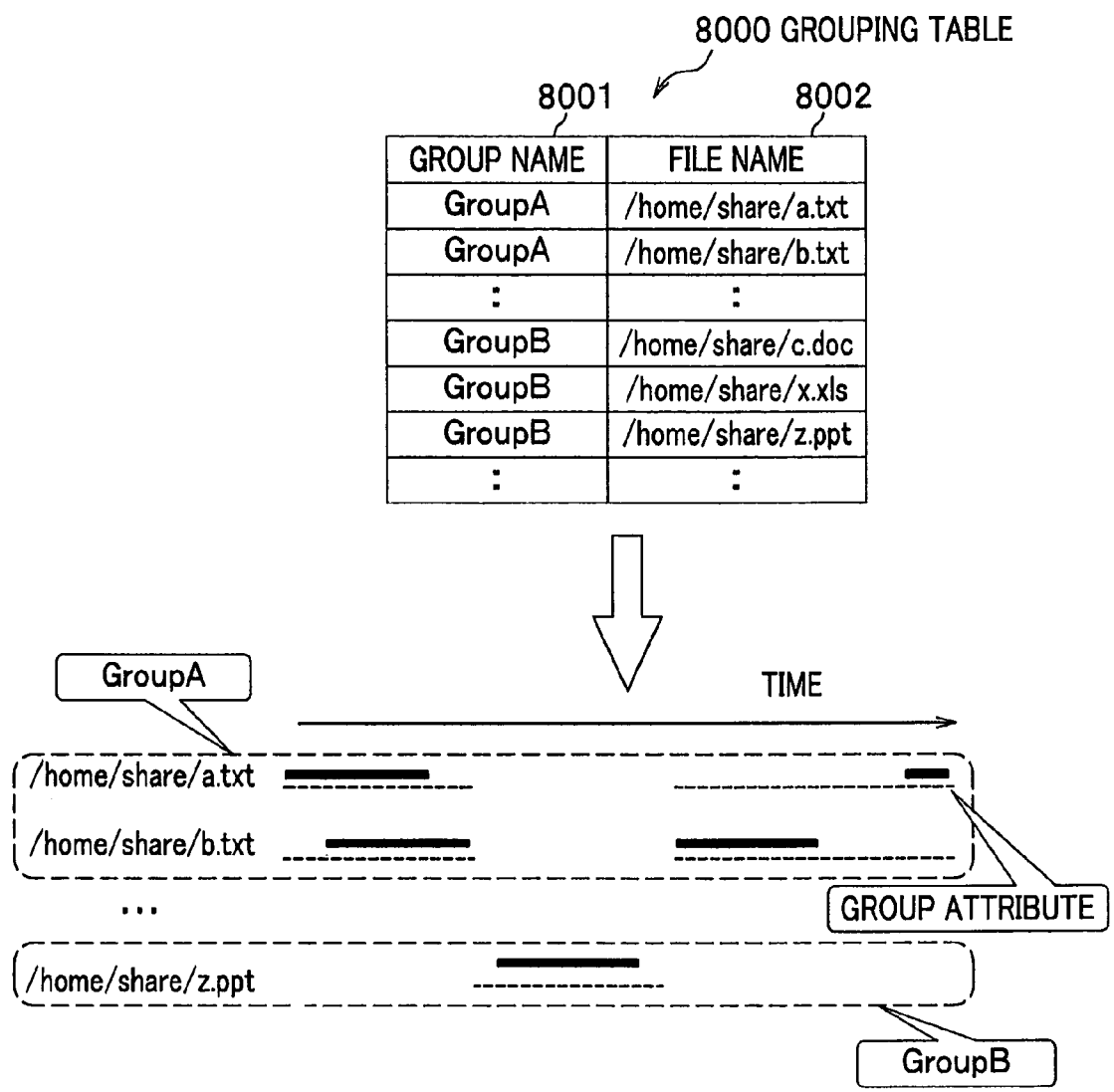
FIG. 19 shows how to group files and change-their groups.
Figure 20:
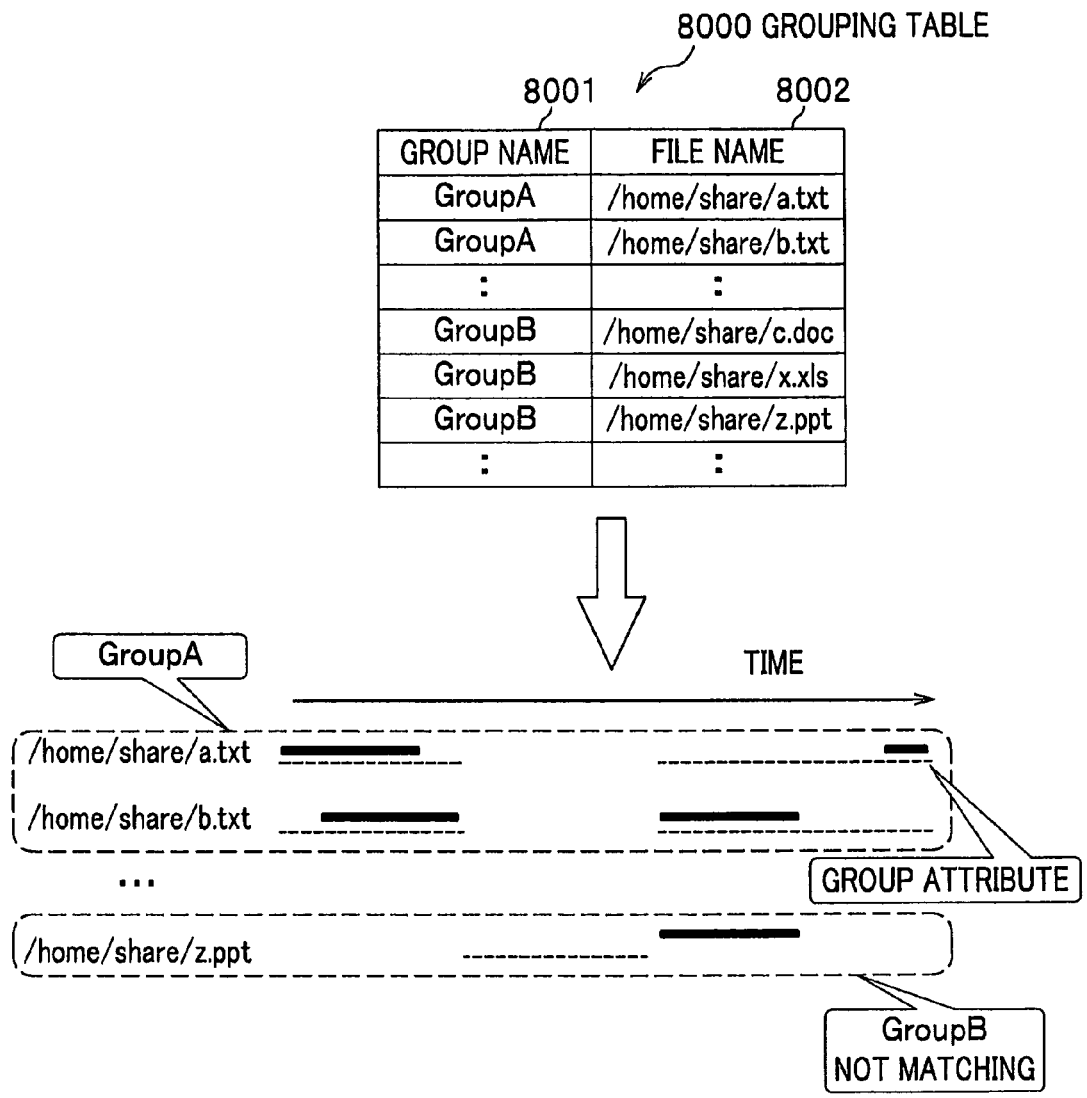
FIG. 20 shows how to group files and change their groups.

Next, it is determined whether or not each access time matches the current grouping table at the present time. A broken thin line (group attribute) under each black bold line of FIGS. 19 and 20 represents a file access available time period, which is reverse to a stop time period of each file requested from the schedule table 7000 and the grouping table 8000. As shown in FIG. 19, if an access time matches its grouping table, the black bold line stays within its corresponding broken thin line. This means that the actual file accesses were made in accordance with the defined schedule; therefore, there is no need to migrate the files of the interest.

On the other hand, as shown in FIG. 20, if an access time does not match its corresponding grouping table, its black bold line stays out of its corresponding thin broken line under this black bold line (see Group B). This means that the actual file access was not made in accordance with the defined schedule, and the file access was made during the stop time period of the RAID group associated with the group of the files of interest; therefore, basically a spin-down operation cannot be executed, thus meaning that there is a need to migrate the files of interest. Hence, an optimized file migration is led out from the schedule table 7000 and the grouping table 8000, to be executed.

Figure 21:
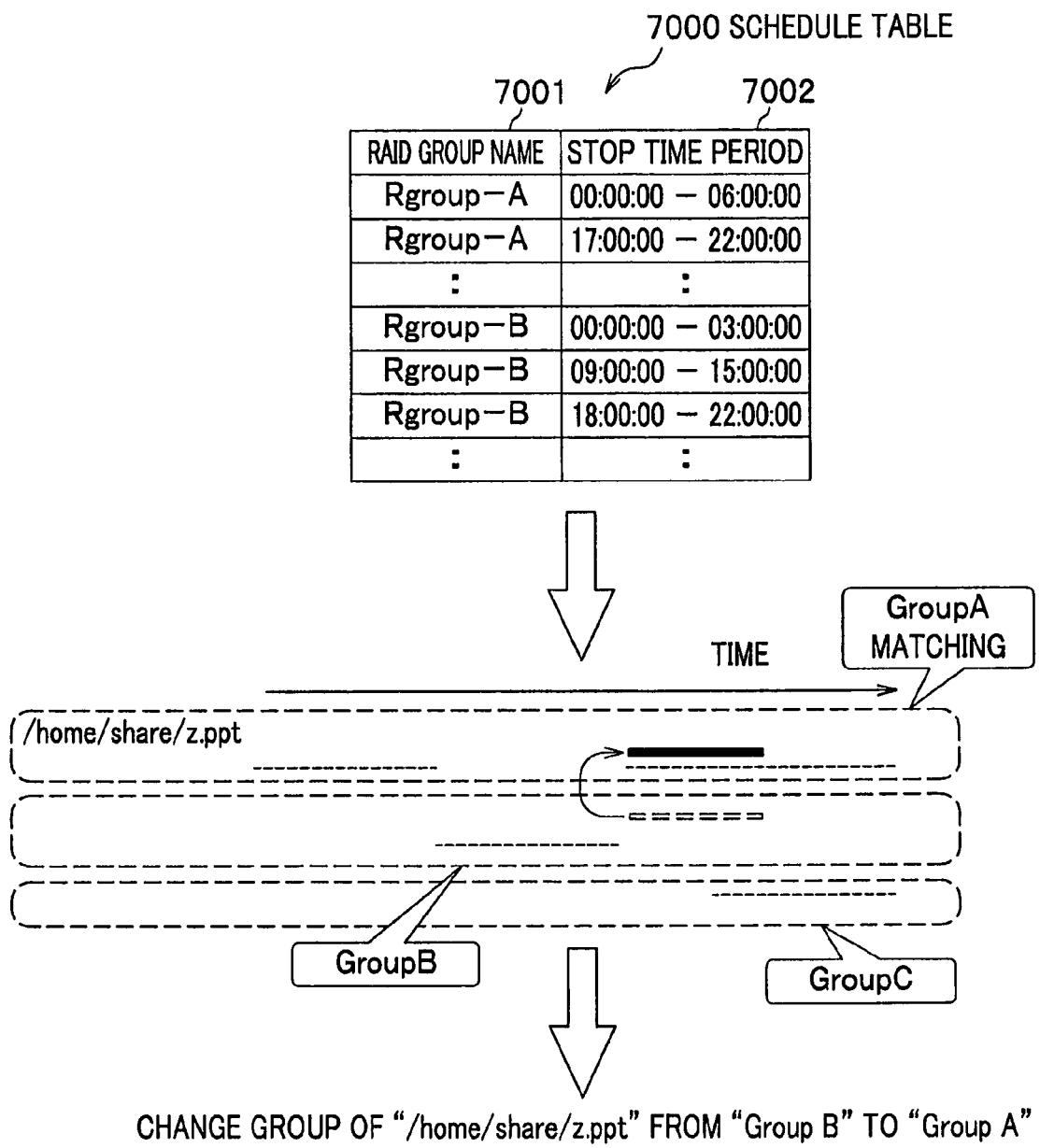
FIG. 21 shows how to group files and change their groups.

In FIG. 21, the file "/home/share/z.ppt" belonging to the Group B matches the file-access available time period (thin broken line) of the RAID group associated with the Group A; therefore, the group of said file is migrated from the Group B to the Group A. In accordance with this change the mapping table 6000 is also changed.

Determination of the above-mentioned file migration depends on if a file access time period matches its file access available time period, in other words, if a time period when a RAID group stops matches its time period when no file access is made.

The above-mentioned file migration may also be carried out in such a manner that a file access available time period of a RAID group of a file group of interest is changed so that the file access time period of said file stays within the changed file access available time period, instead of changing the file group as mentioned above. In this case, it is desirable to change the file access available time period within a range to realize a desired power saving.

When grouping files, a time required for executing a spin-up/-down operation itself should be taken into account.

Figure 22:
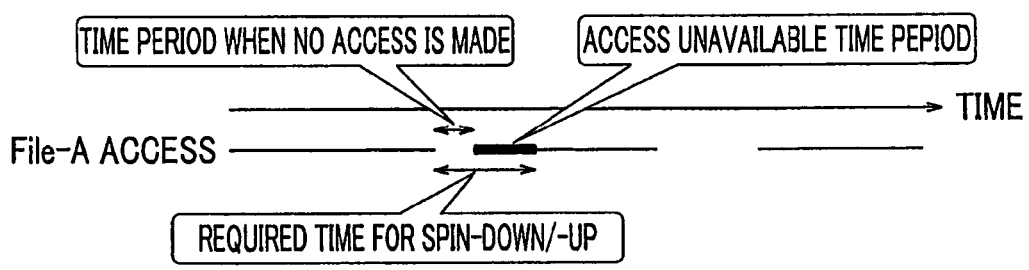
FIG. 22 shows how to perform a file access with taking account of a time required for executing a spin-up/-down operation itself.
Figure 23:
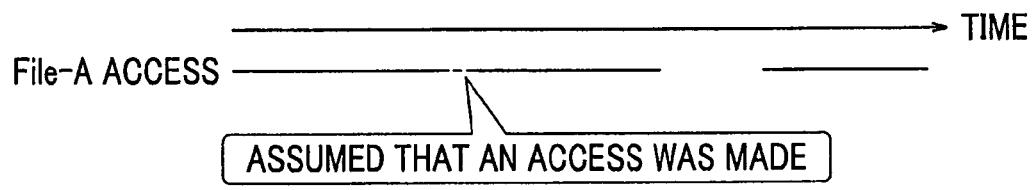
FIG. 23 shows how to perform a file access with taking account of a time required for executing a spin-up/-down operation itself.

FIGS. 22 and 23 show how to perform a file access with taking account of a time required for executing a spin-up/-down operation itself. As shown in FIG. 22, if a time period when no file access is made is shorter than a time required for executing a spin-down/-up operation (particularly, a time required for executing a spin-up/-down operation in a RAID group which is a destination of the file migration), time delay due to spin-up/-down in a shorter time may cause reduction of the file access available time period, so that a spin-up/-down operation may be over headed in a very small stop time period. Although there is a time period when a file access is available, if a spin-up/-down operation is carried out, it can be said that this time period substantially becomes a file access unavailable time (see bold lines of FIG. 22) To address such shortage, as shown in FIG. 23, it may be preferable that, a time required for a spin-up/-down operation is previously measured (a measured time may be stored on the memory 1008, for example), and an empty time (i.e. time period when no access is made) shorter than a time required for executing the spin-down/-up operation is assumed that an access is being made (broken lines of FIG. 23), and then access time periods are grouped based on this assumption.

Therefore, when analyzing the access information (logs), the following steps are needed:
(1) reading logs
(2) modifying (filling-in) logs if an extracted empty time is shorter than a time required for the spin-up/-down operation.
(3) storing the modified logs
(4) analyzing the modified logs

[Spin-Down/-Up Process]

Figure 24:
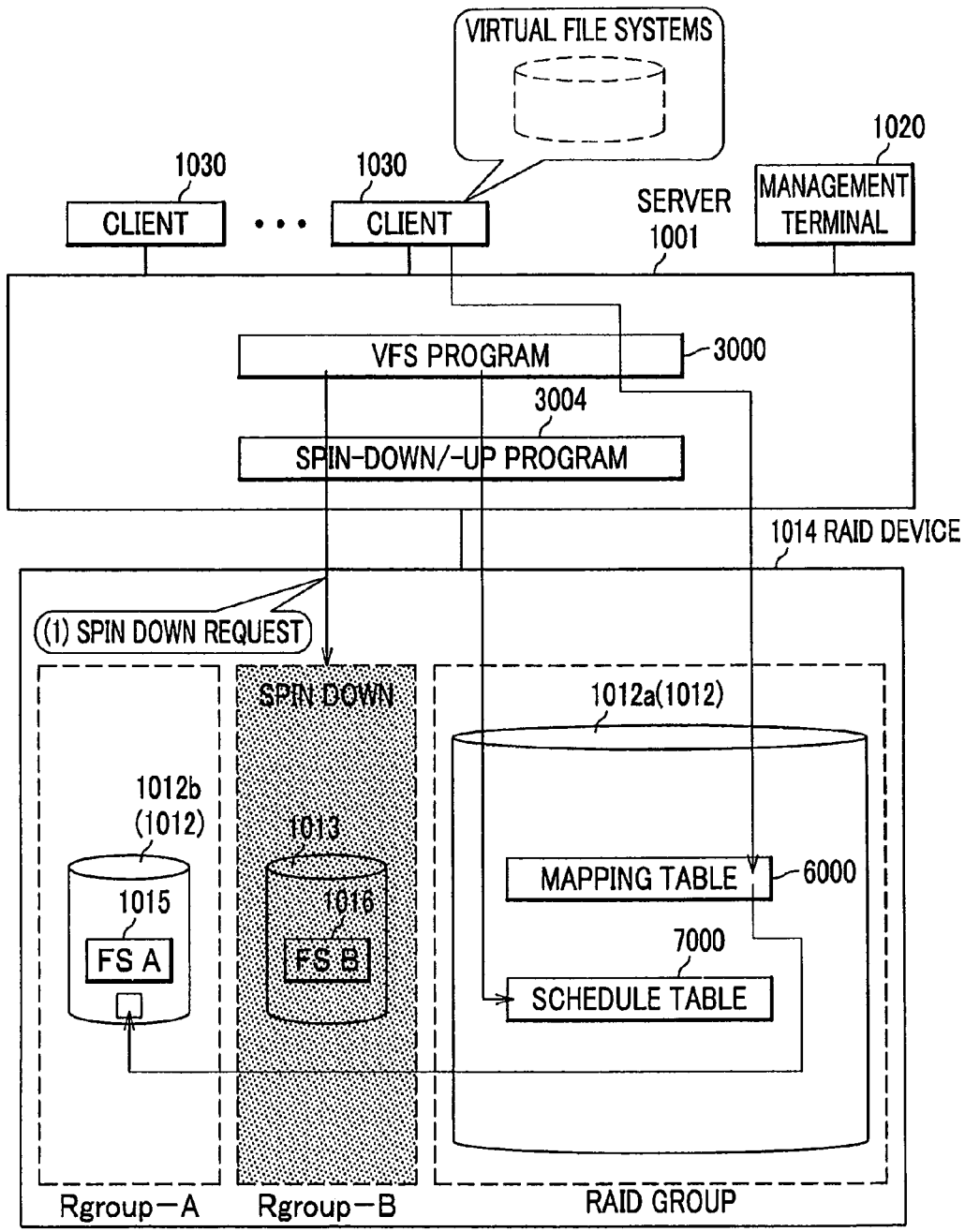
FIG. 24 shows an example of a structure of a file management system, describing how a spin-down/-up process is executed.

FIG. 24 shows an example of a structure of a file management system, describing how a spin-down/-up process is executed. For the convenience of explanation, the drawing of FIG. 1 is simplified. Based on the schedule stored or updated on the schedule table 7000, a spin-down operation is executed on a RAID group of interest.

The VFS program 3000 requests a spin-down request for the Rgroup-B (see (1) of FIG. 24). Even if a file access request is made to access a file stored on the LU of the Rgroup-B that is being spun down by a user during the spin-down operation, said file is already migrated to the LU of the Rgroup-A that is being spun up, and the RAID group on which the Rgroup-A and the mapping table 6000 are stored is currently being operated. Therefore, said file can be accessed continuously, while the spin down operation is securely being carried out, thereby to realize power saving. In addition, a user can see only the virtual file systems, and he or she does not have to be aware of file migrations at all. Based on the above-mentioned schedule, a spin-up operation is also carried out on said RAID group.

Next, descriptions will be provided on the processes carried out by the file access program 3001, the file access information collection program 3002, the migration program 3003, and the spin-down/-up program 3004.

Figure 25:
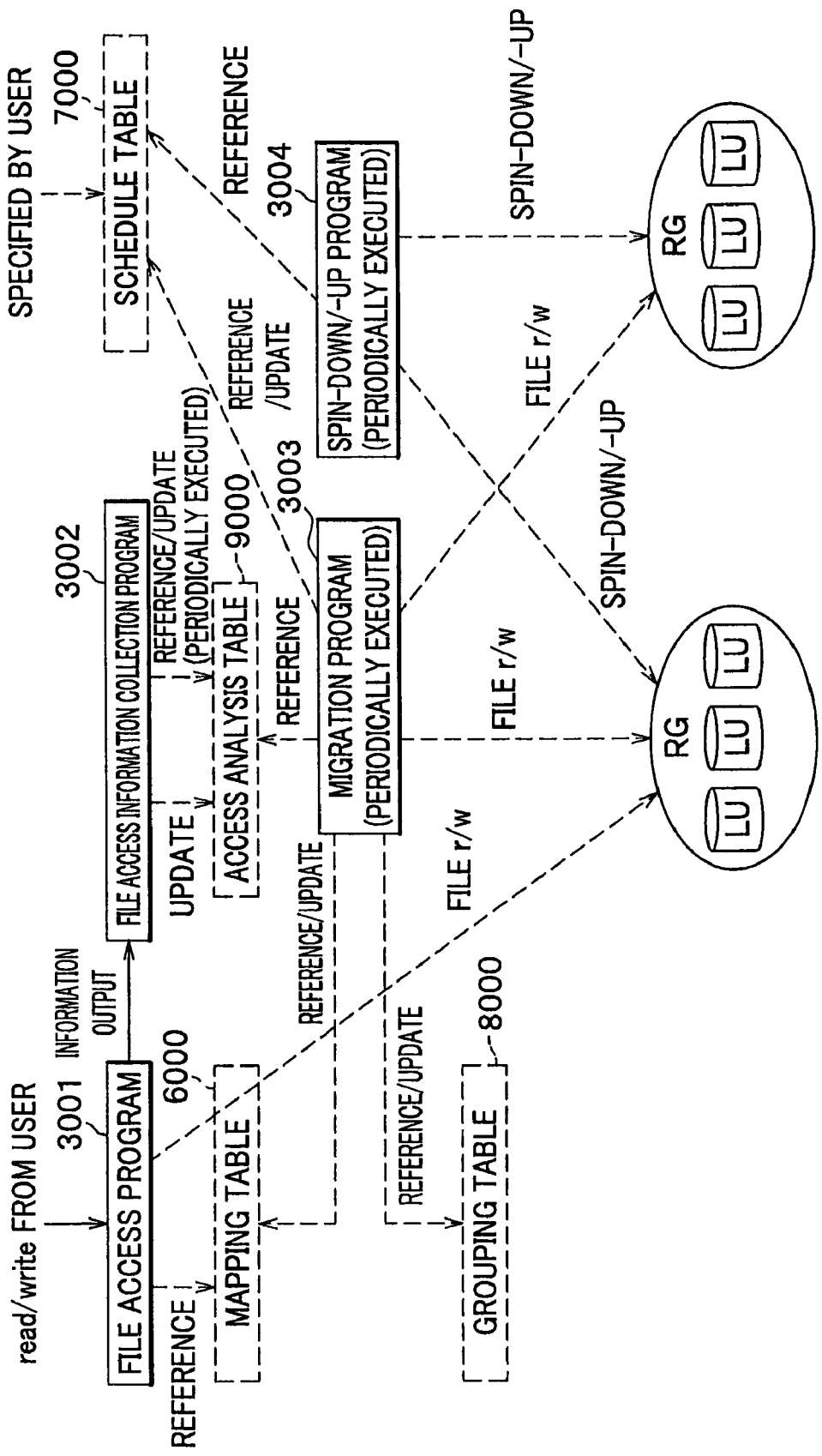
FIG. 25 shows a flow of whole processes carried out by the file access program, the file access information collection program, the migration program, and the spin-down/-up program.

FIG. 25 shows a flow of the whole process carried out by the file access program 3001, the file access information collection program 3002, the migration program 3003, and the spin-down/-up program 3004. These processes are actually performed by the CPU 1002. However, for the convenience of the flowing explanations, the processes are exemplified to be carried out by each program.

When receiving a read/write request (for the convenience of explanation, a file access request is exemplified to be a read request and a write request, but not limited to this), the file access program 3001 refers to the mapping table 6000, and executes a read or write process (file r/w) of a file of interest on the LU constituting the RG (denoting a "RAID group") where the file of interest is stored.

The file access information collection program 3002 reads outputs information which is a result from the process executed by the file access program 3001, so as to analyze the file access states. Then, the file access information collection program 3002 registers the analyzed results on the access analysis table 9000 and updates the table 9000. Meanwhile the file access information collection program 3002 periodically refers to and updates the access analysis table 9000, and deletes older information, for example.

The migration program 3003 refers to the access analysis table 9000 to group the files, and registers results of the grouping on the grouping table 8000 and updates the table 8000. Meanwhile, the migration program 3003 refers to the schedule table 7000 specified by a user, for example, and executes a file r/w to migrate files in accordance with the schedule information, and copies the files stored on the LU of the RG that is a migration source to the LU of the RG that is a migration destination. The results of the file migration are reflected on the mapping table 6000, the schedule table 7000 and the grouping table 8000 so as to update these tables 6000, 7000 and 8000, if necessary. Such processes are executed periodically.

The spin-down/-up program 3004 refers to the schedule table 7000, and carries out the spin-down or spin-up operation on the RG of interest in accordance with the schedule information.

Next, descriptions will be given on each process carried out by the file access program 3001, the file access information collection program 3002, the migration program 3003, the spin-down/-up program 3004. These processes are performed mainly by the CPU 1002.

Figure 26:
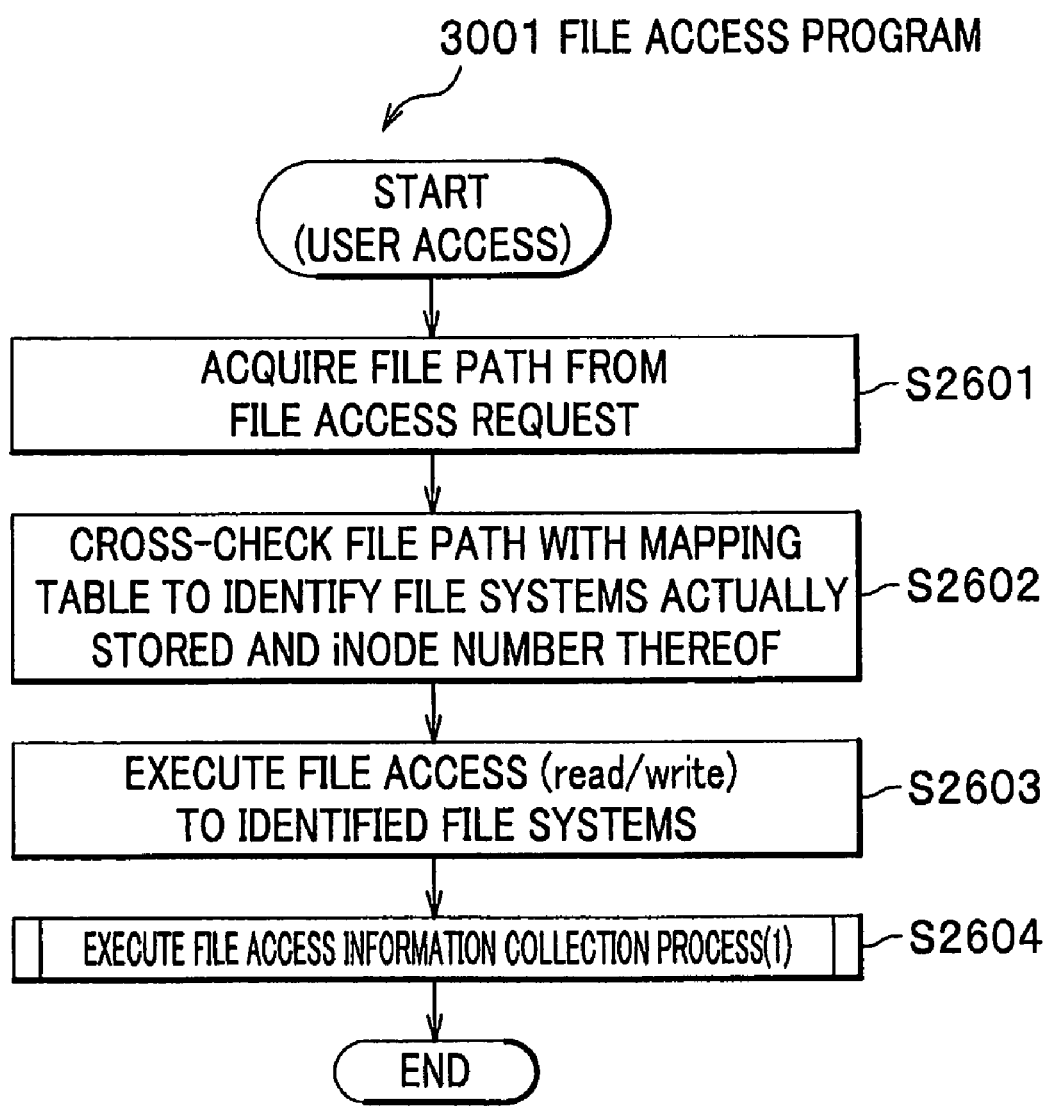
FIG. 26 shows a flow of process carried out by the file access program.

FIG. 26 shows a flow of the process carried out by the file access program 3001. The process starts with a file access of a user from the client 1030.

First, in S2601, the CPU 1002 acquires a file path name (file name) of a file of interest from a file access request included in a user access. After the file path name is acquired, the CPU 1002 proceeds to S2602.

Next, in S2602, the CPU 1002 cross-checks the file path name with the mapping table 6000, so as to identify a file system (real file system) where the file of interest actually stored as well as the inode number (inode number for the real file system). Then, the CPU 1002 extracts a record of interest from the mapping table 6000, using the file name as a query key. After the record is identified, the CPU 1002 proceeds to S2603.

Then, in S2603, the CPU 1002 executes a file access (for the convenience of explanation, a read or write request is used as an example) to the above identified file system. After the file access is executed, the CPU 1002 proceeds to S2604.

In S2604, the CPU 1002 executes the file access information collection process (1) described later. After executing the process (1), the CPU 1002 ends the process carried out by the file access program 3001.

Now, the description of the process carried out by the file access program 3001 is ended.

FIG. 27 shows a flow of the process carried out by the file access information collection program 3002. The process mainly includes the file access information collection processes (1) and (2). First, hereinafter a description will be given on the file access information collection process (1). The file access information collection process (1) is started by a call from the file access program 3001 (S2604).

In S2701, the CPU 1002 acquires access information regarding the file access made in S2603. After acquiring the access information, the CPU 1002 proceeds to S2702.

Next, in S2702, the CPU 1002 refers to the access analysis table 9000 stored on the FC disk drive 1012*a*. After referring to the table 9000, the CPU 1002 proceeds to S2703.

Then, in S2703, the CPU 1002 merges the acquired access information into the access analysis table 9000. After merging the access information, the CPU 1002 proceeds to S2704.

Next, in S2704, the CPU 1002 updates the access analysis table 9000 so as to reflect the merging results. After updating the table 9000, the CPU 1002 ends the file access information collection process (1), and the process is returned to the file access program 3001 which is the call source.

Next, the file access information collection process (2) will be described hereinafter. The CPU 1002 periodically starts the file access information collection process (2).

First, in S2705, the CPU 1002 searches the access analysis table 9000 for access information older than the time limit (1) (see the configuration information), and delete this older access information. After deleting the older access information, the CPU 1002 proceeds to S2706.

Next, in S2706, the CPU 1002 searches the access analysis table 9000 for access information newer than the time limit (1) but older than the time limit (2) (see the configuration information). After searching this access information, the CPU 1002 proceeds to S2707.

Then, in S2707, the CPU 1002 classifies the search result per file. The search result classified includes the number of access users of the file of interest. After classifying the search result, the CPU 1002 proceeds to S2707.

In S2708, the CPU 1002 determines whether or not the number of access users is greater than a predetermined value from the classified search result. This predetermined value may be input from an administrator and be stored on the memory 1008, for example. If the number of access users is not greater than the predetermined value (No in S2708), the CPU 1002 proceeds to S2709. On the other hand, the number of access users is greater than the predetermined value (Yes in S2708), the CPU 1002 proceeds to S2710.

In S2709, the CPU 1002 deletes all the access information having the classified result of less access users since the CPU 1002 deems that such access information is worthless to be used for generating a schedule. After deleting the information, the CPU 1002 ends the file access information collection process (2).

Next, in S2710, the CPU 1002 deletes part of the access information having the classified result of more access users. The rest of the information after being partially deleted will be deleted part by part at the following several steps. At this time, the number of steps of partial delete may be set as desired. When partially deleting the access information step by step, it may be preferable in creating the schedule to delete part of the access information having less number of access users, in order. After deleting the access information, the CPU 1002 ends the file access information collection process (2).

Now, the description of the process carried out by the file access information collection program 3002 is ended.

Figure 28:
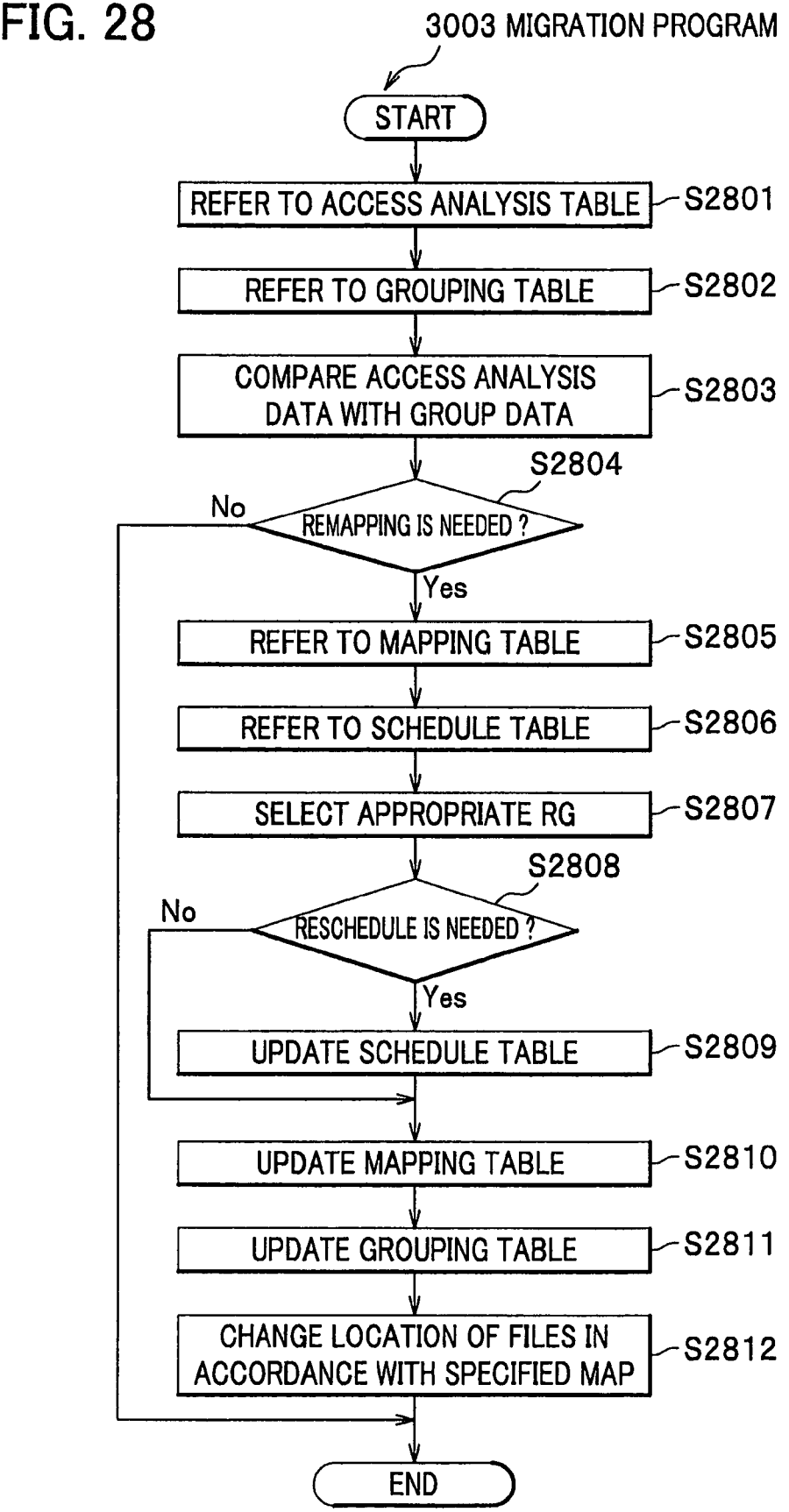
FIG. 28 shows a flow of a process carried out by the migration program.

FIG. 28 shows a flow of the process carried out by the migrations program 3003. The process is started periodically.

First, in S2801, the CPU 1002 refers to the access analysis table 9000. After referring to the table 9000, the CPU 1002 proceeds to S2802.

Next, in S2802, the CPU 1002 refers to the grouping table 8000. After referring to the table 8000, the CPU-proceeds to S2803.

Next, in S2803, the CPU compares the access analysis data (access information registered on the access analysis table 9000) with the group data (file information registered on the grouping table 8000). After comparing the data, the CPU 1002 proceeds to S2804.

Then, in S2804, the CPU 1002 determines whether or not remapping is needed. Remapping means a rewriting of the mapping table 6000. Remapping is needed if, during a time period other than the file access available time period, that is, during a stop time period of a RAID group whose LU stores files of interest as a migration source, the files of interest have an access frequency more than a predetermined value in a predetermined time limit. If-remapping is needed (Yes in S2804), the CPU 1002 proceeds to S2805. If no remapping is needed (No in S2804), particularly, there is no file required to be migrated, the process executed by the migration program 3003 is ended.

Next, in S2805, the CPU 1002 refers to the mapping table 6000. After referring the table 6000, the CPU 1002 proceeds to S2806.

Then, in S2806, the CPU 1002 refers to the schedule table 7000. After referring to the table 7000, the CPU proceeds to S2807.

In S2807, the CPU 1002 selects an appropriate RG (RAID group) as desired. This selected RG is the file migration destination. Whether or not the selected RG is proper as the migration destination depends on a determination in S2808. After selecting the RG, the CPU 1002 proceeds to S2808.

In S2808, the CPU 1002 determines whether or not the schedule table 7000 is needed to be rescheduled (rewriting the schedule table 7000). Rescheduling is needed if, in all the RAID groups of the file migration destination, no time for migrating the files (also as well as a time required for a spin-down/-up operation) is included in the file access available time period, that is, the operation time period. If rescheduling is needed (Yes in S2808), the CPU 1002 proceeds to S2809. If no rescheduling is needed (No in S2808), it means that the RG selected in S2807 is operating at the time of the file migration, and this selection of the RG is proper, therefore, the CPU proceeds to S2810.

In S2809, the CPU 1002 updates the schedule table 7000. This updating of the schedule table 7000 is carried out such that the file access available time period of the RAID group that is the file migration destination includes the time for migration of the files. For example, a user specifies an appropriate stop time period. After updating the schedule table 7000, the CPU 1002 proceeds to S2810.

Next, in S2810, the CPU 1002 updates the mapping table 6000 in accordance with the change after the file migration. After updating the table 6000, the CPU 1002 proceeds to S2811.

Next, in S2811, the CPU 1002 updates the grouping table 8000 in accordance with the change after the file migration. After updating the table 8000, the CPU 1002 proceeds to S2812.

In S2812, the CPU 1002 changes the location of the files (i.e. migrates the files) in accordance with the specified map, that is, each updated table (6000, 7000, 8000). After changing the location of the files, the CPC 1002 ends the process executed by the migration program 3003.

Now, the description of the process carried out by the migration program 3003 is ended.

Figure 29:
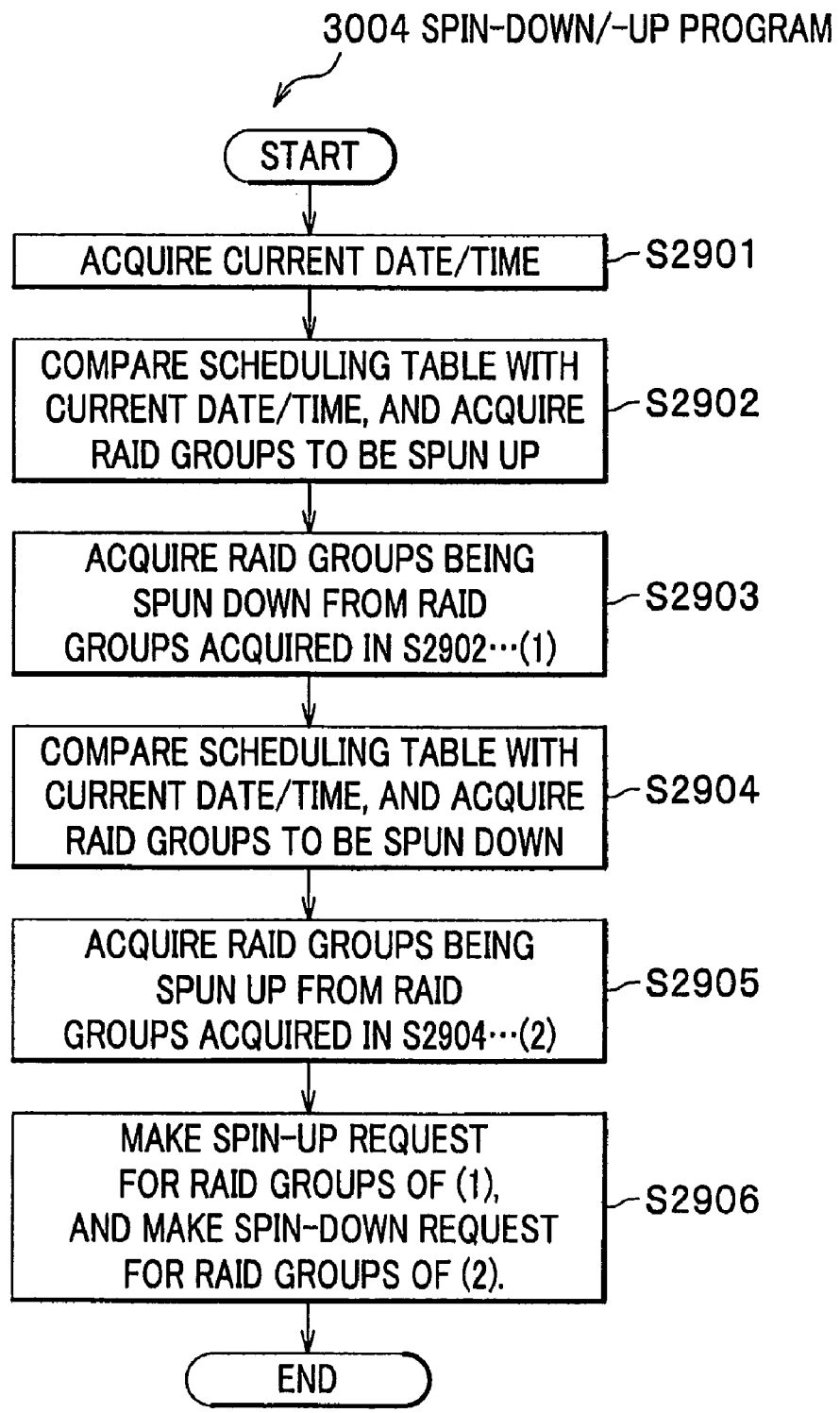
FIG. 29 shows a flow of a process executed by the spin-down/-up program.

FIG. 29 shows a flow of the process executed by the spin-down/-up program 3004. The process is periodically started.

First, in S2901, the CPU 1002 acquires the current time. The current time may be acquired from a timer (not shown) installed in the server 1001. After acquiring the current time, the CPU 1002 proceeds to S2902.

In S2902, the CPU 1002 compares the scheduling table 7000 with the current time, and acquires RAID groups to be spun-up. RAID groups to be spun-up may denote, for example, RAID group whose current time matches the end time of the stop time period thereof. After acquiring the RAID groups, the CPU 1002 proceeds to S2903.

Next, in S2903, the CPU 1002 acquires RAID groups being spun-down from the above acquired RAID groups. For the convenience of explanation, this embodiment only handles spin-up and spin-down as a spin-state of the RAID groups. Therefore, the RAID groups acquired at this stage and RAID groups acquired in S2902 have a current time that matches the end time of their stop time period, but RAID groups in other spin states (e.g. booked spin-down state or spin-off state) are omitted. After acquiring the RAID groups, the CPU 1002 proceeds to S2904.

In S2904, the CPU 1002 compares the scheduling table 7000 with the current time, and acquires RAID groups to be spun-down. The RAID groups to be spun-down may denote, for example, RAID groups whose current time matches the start time of the stop time period. After acquiring the RAID groups to be spun-down, the CPU 1002 proceeds to S2903.

Next, in S2905, the CPU 1002 acquires RAID groups being spun-up from the above acquired RAID groups. For the convenience of explanation, this embodiment only handles spin-up and spin-down as a spin-state of a RAID group. Therefore, the RAID groups acquired at this stage and RAID groups acquired in S2902 have a current time that matches the end time of their stop time periods. After acquiring the RAID groups to be spun-up, the CPU 1002 proceeds to S2906.

In S2906, the CPU 1002 sends a spin-up request to spin up the RAID groups acquired in S2903, and sends a spin-down request to spin down the RAID groups acquired in S2905.

Now the description of the process carried out by the spin-down/-up program 3004 are ended.

According to Embodiment 1, even if a file access is made to the files stored on the RAID groups to be spun-down, migration of these files to RAID groups being spun-up is previously carried out, so that the file access can be accepted, thereby to realize power saving even under an environment in which file accesses are continuously made.

As for file systems, a user can see only virtual file systems of virtually integrated real file systems, but can never see the real file systems themselves. Therefore, even if a file migration between RAID group is made, a user never be aware of the migration, that is, a user can do a file access as usual.

In Embodiment 1, when each program uses an operating, function such as a system call, Embodiment 1 uses virtual file systems, not using a stub that calls a system call of interest instead, thereby to enhance choice of file migration destinations. Specifically, in the case of using a stub, file migration can be carried out only to a destination defined by the stub itself. On the other hands, in the case of using virtual file systems, it is possible for an administrator to specify an optimized migration destination while taking account of operational states of the RAID groups. It is preferable to choose a migration destination that maximizes power saving, that is, a migration destination in which the sum of stop time periods of each RAID group becomes longest.

Embodiment 2

In Embodiment 1, since files are classified and migrated based on the file access states, files having a similar access attribute are likely to be concentrated on a single RAID group or LU. Therefore, frequent accesses made on part or all of those files may cause a problem of performance, such as a performance bottleneck.

To address this shortage, FC (Fiber Channel) paths (ports) used for coupling the RAID groups that have been spun-down with the NAS device (server 1001) are temporarily distributed to the RAID groups being operated (being spun-up) so as to avoid such a performance bottle neck due to the concentrated file accesses.

Specifically, on the schedule table 7000, there may be provided fields for storing conditions for FC paths distribution as well as names of RAID groups which will be destinations of the FC paths distribution (e.g. every RAID group (in operation) except for the RAID groups of interest). One example of the above conditions may be such that free space of the volumes constituting the RAID group for accepting the number of file accesses within a unit time and the distribution of the file accesses is more than a predetermined value, for example. If the file access state does not meet the above condition, it may be controlled to end the distribution. The above distribution may be done at once or step by step.

Note that various components to realize Embodiment 2 are the same as those of Embodiment 1, therefore, details descriptions thereof will be omitted.

Embodiment 3

Since the schedule defined on the schedule table 7000 of Embodiment 1 is created based on the statistical processes of the file access information, file accesses may occur even during the stop time period defined on the schedule. Therefore, spin-down operation may cause time delay so that power saving cannot effectively be realized. In order to achieve a desired power saving, it is necessary to offset increase of power consumption due to the spin-down time delay, thus, spin-up time delay should be intentionally made in a next file access, for example.

To address this shortage, it is controlled to proportionally distribute the spin-up delay time to each RAID group. At this time, each RAID group has its importance defined by its operational reason, therefore, it may be preferable to distribute the spin-up time delay to each RAID group in, proportion to its importance, for example. As a specific example, if 500 second time delay occurs in a certain RAID group, this time delay may be distributed among RAID groups in proportion to each importance thereof as follows.

| \<RAID group name\> | \<Importance\> | \<Spin-up delay time/[s]\> |
|---|---|---|
| Rgroup-A01 | A | 5 |
| . | . | . |
| . | . | . |
| . | . | . |
| Rgroup-A10 | A | 5 |
| Rgroup-B01 | B | 15 |
| . | . | . |
| . | . | . |
| Rgroup-B10 | B | 15 |
| Rgroup-C01 | C | 30 |
| . | . | . |
| . | . | . |
| Rgroup-C10 | C | 30 |

Total: 5 × 10 + 15 × 10 + 30 × 10 = 500 [s]

In the above example, importance becomes greater to smaller in the order from A, B to C. A RAID group having a greater importance is set to have a shorter delay time of spin-up. This importance may be defined based on the number of LUs included in a RAID group of interest and the number of file accesses from a user, and may be stored on the memory 1008.

Accordingly, without deteriorating power saving effect, time delay distribution can minimize affects of time delay on user's convenience. The above-mentioned time delay distribution can be made on every RAID group regardless of whether the RAID group of interest is currently being spun-up or spun-down.

The embodiments that embody the present invention are not limited to them, and the embodiments may be modified in various forms.

For example, when choosing a RAID group to be spun-down, a hard disk performance may be taken into account. The hard disk performance may include frequency of a CPU used, a type, capacity, reliability of a hardy disk used. Such a hard disk performance may be used through Embodiments 1 to 3.

In Embodiment 3, file systems are hierarchized, so as to broaden a choice range of file migration destinations, compared with the case of using a stub. In such a configuration of the present embodiment, if files of interest are likely to be access very frequently, it may be preferable to use RAID groups having faster-speed volumes that create real file systems (FS A (1015) in Embodiment 3 (see FIG. 2)) in upper hierarchies as a migration destination. Meanwhile, if files of interest are seldom accessed, it may be preferable to use RAID groups having slower-speed volumes that create real file systems (FS B (1016) in Embodiment 3 (see FIG. 2)) in lower hierarchies as a migration destination. That is, the hierarchy of file systems may be used as criterion in selecting a destination of a file migration.

Note that, similar to Embodiment 1, various components to realize Embodiment 3 are the same as those of Embodiment 1, therefore, details descriptions thereof will be omitted.

Other specific configurations such as hardware, software, various tables, various flow charts may be modified and changed within the scope of the present invention.

As described above in details, the file management system of the present invention analyzes file access states, and identifies a typical time period when file accesses to files are made. To identify a typical time period of file accessing means to identify, a time period when no file access is made at the same time. One or more files that are expected not to be accessed during the identified time period are handled as one group, and the files of this group are associated with a RAID group in which a stop time period to spin down and stop an operation of logical volumes thereof is defined. According to the above association, files stored on a RAID group defined to be spun down at a certain time period will be migrated to another RAID group in a spin-up operation, if necessary.

Therefore, even if a file access is made to files stored on the RAID group that is to be spun down in the stop time period, the files are already migrated to and stored on another RAID group being spun up. Thus, the user access can be continued, and the RAID group to be spun down can be spun down as planned. As mentioned above, a problem that the spin-down operation cannot be done because just one file access is made can be prevented. In this way, time periods to spin down volumes can be increased so as to enhance power saving.

File systems managed by the file server are used as virtual file systems including virtually integrating plural real file systems. The file server, using the virtualization of file systems, never represents a user real file systems created on at least one logical volume, but represents the user virtual file systems created by virtually integrating real file systems. Hence, even if files of interest are migrated and the real file systems in which the files of interest are changed, the user can see only the virtual file systems so that he or she can execute a file access without being aware of the changed real file systems.

According to the present invention, it is possible to realize power saving even under an environment in which file accesses are continuously made.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A file server, communicably coupling to a storage device having plural RAID groups, each including at least one volume and communicably coupling to a client that makes a file access request to files, and managing files stored on the RAID groups, using real file systems created to the RAID groups and virtual file systems created by virtually integrating the real file systems, comprising:
 a memory device having memory area for creating information to be stored on the storage device; and
 a controller,
 wherein the storage device storing:
 mapping information that associates a file name used for managing the files in the virtual file systems, the RAID groups on which the files are stored, and the real file systems that actually manages the files, with one another for each of the files; and
 schedule information in which, for each of the RAID groups, a stop time period to spin down and stop the RAID group, and an operation time period to spin up and operate the RAID group are defined,
 wherein the controller acquires the file name and a file access date/time included in a file access request in response to the file access request made by the client, and creates access information that associates the file name with the file access date/time, and stores the created information on the storage device,
 wherein the controller classifies files by grouping files having a common file access time period into one group based on the access information, defines some of the RAID groups on which the files grouped into said one group is to be stored in such a manner that the file access time period and the stop time period are not overlapped, migrates the files of said one group to the defined RAID groups during being operated, and updates the mapping information regarding the migrated files, and
 wherein the controller executes a spin down operation for the RAID groups in the stop time period, and executes a spin up operation for the RAID groups in the operation time period.

2. A file server according to claim 1, wherein the schedule information includes a condition in which if the number of files stored on certain RAID groups among the RAID groups are more than a predetermined value, and some or all these files of which number is more than the predetermined value also have a file access frequency more than a predetermined frequency, then some of ports used for coupling the file server with the RAID groups are distributed to other RAID groups than said certain RAID groups storing the files of which number is more than the predetermined value, and wherein the controller executes the port distribution if the condition is satisfied.

3. A file server according to claim 1, wherein the memory device stores an importance regarding spin-up time delay for each of the RAID groups, and wherein the controller, if a file access request is made to files stored on certain RAID groups during the stop time period of the certain RAID group, executes an operation to delay the spin up time for all the RAID groups so that the greater the importance becomes, the shorter the spin-up time delay becomes.

4. A file server according to claim 1, wherein, when receiving the file access request, the controller deems that the time period when no file access is made is included in the time period when a file access is made if the time period when no file access is made is shorter than a time period required for executing a spin down on RAID groups among the RAID groups on which the files are to be stored, and then executing the file classifying operation.

5. A file server according to claim 1, wherein the access information further associates a user name who made the file access request with the file name and the file access date/time, and wherein the controller executes an operation to delete some of or all the access information based on the file access date/time and the number of users who made the file access request.

6. A file management system comprising:
 a storage device having plural RAID groups, each including at least one volume;
 a client that makes a file access request to files; and
 a file server managing files stored on the RAID groups, using real file systems created for the RAID groups and virtual file systems created by virtually integrating the real file systems;
 wherein the storage device stores:
 mapping information that associates file names used for managing the files in the virtual file systems, the RAID groups on which the files are stored, and the real file systems the real file systems that actually manages the files with one another, for each of the files; and schedule information in which, for each of the RAID groups, a stop time period to spin down and stop the RAID group, and an operation time period to spin up and operate the RAID group are defined, wherein the file server acquires the file name and a file access date/time included in a file access request in response to the file access request made by the client, and creates access information that associates the file name with the file access date/time, and stores the created information on the storage device, wherein the file server classifies files by grouping files having a common file access time period into one group based on the access information, defines some of the RAID groups on which the files grouped into said one group is to be stored in such a manner that the file access time period and the stop time period are not overlapped, migrates the files of said one group to the defined RAID groups during being operated, and updates the mapping information regarding the migrated files, and wherein the file server executes a spin down operation for the RAID groups in the stop time period and executes a spin up operation for the RAID groups in the operation time period.

7. A file management system according to claim 6, wherein the schedule information includes a condition in which if the number of files stored on certain RAID groups among the RAID groups are more than a predetermined value, and some or all these files of which number is more than the predetermined value also have a file access frequency more than a predetermined frequency, then some of ports used for coupling the file server with the RAID groups are distributed to other RABID groups than said certain RAID groups storing the files of which number is more than the predetermined value, and wherein the file server executes the port distribution if the condition is satisfied.

8. A file management system according to claim 6, wherein the file server stores an importance regarding spin-up time delay for each of the RAID groups, and wherein if a file access request is made to files stored on certain RAID groups during the stop time period of the certain RAID group, the file server executes an operation to delay the spin up time for all the RAID groups so that the greater the importance becomes, the shorter the spin-up time delay becomes.

9. A file management system according to claim 6, wherein, when receiving the file access request, the file server deems that the time period when no file access is made is included in the time period when a file access is made if the time period when no file access is made is shorter than a time period required for executing a spin down on RAID groups among the RAID groups on which the files are to be stored, and then executing the file classifying operations.

10. A file management system according to claim 6, wherein the access information further associates a user name who made the file access request with the file name and the file access date/time, and wherein the file server executes an operation to delete some of or all the access information based on the file access date/time and the number of users who made the file access request.

11. A file management method for a file server communicably coupling to a storage device having plural RAID groups, each including at least one volume, and coupling to a client that makes a file access request to files, managing files stored on the RAID groups, using real file systems created for the RAID groups and virtual file systems created by virtually integrating the real file systems, the method comprising:

by the storage device, storing mapping information that associates file names used for managing the files in the virtual file systems, the RAID groups on which the files are stored, and the real file systems that actually manages the files with one another, for each of the files;

by the storage device, storing schedule information in which, for each of the RAID groups, a stop time period to spin down and stop the RAID group, and an operation time period to spin up and operate the RAID group are defined;

by the file server, acquiring the file name and a file access date/time included in a file access request in response to the file access request made by the client, and creating access information that associates the file name with the file access date/time, and storing the created information on the storage device;

by the file server, classifying files by grouping files having a common file access time period into one group based on the access information, defining some of the RAID groups on which the files grouped into said one group is to be stored in such a manner that the file access time period and the stop time period are not overlapped, migrating the files of said one group to the defined RAID groups during being operated, and updating the mapping information regarding the migrated files; and by the file server, executing a spin down operation for the RAID groups in the stop time period and execute a spin up operation for the RAID groups in the operation time period.

12. The file management method according to claim 11, wherein the schedule information includes a condition in which, if the number of files stored on certain RAID groups among the RAID groups are more than a predetermined value, and some or all these files of which number is more than the predetermined value also have a file access frequency more than a predetermined frequency, then some of ports used for coupling the file server with the RAID groups are distributed to other RAID groups than said certain RAID groups storing the files of which number is more than the predetermined value, and wherein the method further comprises:
by the file server, executing the port distribution if the condition is satisfied.

13. The file management method according to claim 11, wherein the method further comprising:

by the file server, storing an importance regarding spin-up time delay for each of the RAID groups; and by the file server, if a file access request is made to files stored on certain RAID groups during the stop time period of the certain RAID group, executing an operation to delay the spin up time for all the RAID groups so that the greater the importance becomes, the shorter the spin-up time delay becomes.

14. The file management method according to claim 11, wherein the method further comprising:

by the file server, when receiving the file access request, deeming that the time period when no file access is made is included in the time period when a file access is made if the time period when no file access is made is shorter than a time period required for executing a spin down on RAID groups among the RAID groups on which the files are to be stored, and then executing the file classifying operation.

15. The file server according to claim 11, wherein the method further comprises:

by the file server, associating a user name who made the file access request with the file name and the file access date/time on the access information; and by the file server, executing an operation to delete some of or all the access information based on the file access date/time and the number of users who made the file access request.

* * * * *